(12) United States Patent
Avestruz et al.

(10) Patent No.: US 11,258,304 B2
(45) Date of Patent: Feb. 22, 2022

(54) MULTIPLE ACCESS WIRELESS POWER TRANSFER

(71) Applicant: The Regents of the University of Michigan, Ann Arbor, MI (US)

(72) Inventors: Al-Thaddeus Avestruz, Ann Arbor, MI (US); Akshay Sarin, Ann Arbor, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 0 days.

(21) Appl. No.: 16/504,192

(22) Filed: Jul. 5, 2019

(65) Prior Publication Data
US 2020/0014247 A1 Jan. 9, 2020

Related U.S. Application Data

(60) Provisional application No. 62/694,277, filed on Jul. 5, 2018.

(51) Int. Cl.
*H02J 50/12* (2016.01)
*H02J 50/40* (2016.01)
(Continued)

(52) U.S. Cl.
CPC .............. *H02J 50/12* (2016.02); *H02J 7/025* (2013.01); *H02J 50/40* (2016.02); *H02J 50/80* (2016.02)

(58) Field of Classification Search
CPC .. H04K 1/00; H02J 50/10; H02J 50/80; H02J 50/90; H02J 50/60; H02J 7/02;
(Continued)

(56) References Cited

U.S. PATENT DOCUMENTS

2006/0145762 A1* 7/2006 Leete ................. H03F 3/45183
330/254
2008/0019523 A1* 1/2008 Fuse ..................... H04L 9/088
380/256
(Continued)

OTHER PUBLICATIONS

J. K. Madawala and D. J. Thrimawithana, "A Bidirectional Inductive Power Interface for Electric Vehicles in V2G Systems," IEEE Transactions on Industrial Electronics, vol. 58, pp. 4789-4796, 2011.
(Continued)

*Primary Examiner* — Hal Kaplan
(74) *Attorney, Agent, or Firm* — Lempia Summerfield Katz LLC

(57) ABSTRACT

A device configured for wireless power transfer includes a digital controller configured to generate a plurality of switch control signals, and a transceiver configured to generate a wireless signal for the wireless power transfer. The transceiver includes a plurality of switches, each switch of the plurality of switches being responsive to a respective switch control signal of the plurality of switch control signals such that the wireless signal has a waveform shaped in accordance with a code sequence for the wireless power transfer. The code sequence is one of a set of predetermined code sequences, each predetermined code sequence being orthogonal to each other predetermined code sequence of the set of predetermined code sequences.

56 Claims, 22 Drawing Sheets

(51) Int. Cl.
  *H02J 7/02*     (2016.01)
  *H02J 50/80*    (2016.01)
(58) Field of Classification Search
  CPC ............ H02J 7/025; H04L 9/00; G06F 15/00;
            H02M 3/156; H02M 3/158
  USPC ...... 307/104, 149, 66, 80, 82, 119; 380/256,
                      380/42
  See application file for complete search history.

(56) References Cited

U.S. PATENT DOCUMENTS

| | | | | |
|---|---|---|---|---|
| 2009/0248357 | A1* | 10/2009 | Abe | G04R 20/10 |
| | | | | 702/176 |
| 2010/0034238 | A1 | 2/2010 | Bennett | |
| 2012/0134241 | A1* | 5/2012 | Nomura | G04R 20/10 |
| | | | | 368/47 |
| 2013/0257360 | A1* | 10/2013 | Singh | H02J 50/60 |
| | | | | 320/108 |
| 2017/0256980 | A1* | 9/2017 | Singh | H02J 50/80 |
| 2019/0013699 | A1 | 1/2019 | Avestruz | |
| 2020/0014214 | A1* | 1/2020 | Nishimoto | H02J 13/0001 |
| 2020/0091836 | A1* | 3/2020 | Lee | H02M 3/158 |

OTHER PUBLICATIONS

A. Pacini, A. Costanzo, S. Aldhaher, and P. D. Mitcheson, "Load- and Position-Independent Moving MHz WPT System Based on GaN-Distributed Current Sources," IEEE Transactions on Microwave Theory and Techniques, vol. 65, pp. 5367-5376, 2017.
A. Sarin and A.-T. Avestruz, "Scaling wireless power transfer through code division multiple access," in 2018 IEEE PELS Workshop on Emerging Technologies: Wireless Power Transfer (Wow). IEEE, 2018,pp. 1-6.
A. Sarin, X. Cui, and A.-T. Avestruz, "Comparison of switched receiversfor direct-sequence spread-spectrum wireless power transfer," in 2017 IEEE 18th Workshop on Control and Modeling for Power Electronics (COMPEL). IEEE, 2017, pp. 1-8.
A.-T. Avestruz, A. H. Chang, and S. B. Leeb, "Quad-switch push-pull(qspp) rf amplifier with direct, simultaneous modulation of phase andpulse position for spread-spectrum power applications," in 2015 IEEE Applied Power Electronics Conference and Exposition (APEC). IEEE,2015, pp. 3367-3374.
C. Zhao and D. Costinett, "Gan-based dual-mode wireless power transfer using multifrequency programmed pulse width modulation," IEEE Transactions on Industrial Electronics, vol. 64, No. 11, pp. 9165-9176, 2017.
D. Ahn and S. Hong, "Effect of coupling between multiple transmittersor multiple receivers on wireless power transfer," IEEE Transactions on Industrial Electronics, vol. 60, No. 7, pp. 2602-2613, 2013.
D. J. Perreault, J. Hu, J. M. Rivas, Y. Han, O. Leitermann, R. C. N. Pilawa-Podgurski, et al., "Opportunities and Challenges in Very High Frequency Power Conversion," in 2009 Twenty-Fourth Annual IEEE Applied Power Electronics Conference and Exposition, 2009, pp. 1-14.
G. Monti, M. Dionigi, M. Mongiardo, and R. Perfetti, "Optimal design of wireless energy transfer to multiple receivers: power maximization," IEEE Transactions on Microwave Theory and Techniques, vol. 65, No. 1, pp. 260-269, 2017.
G. Yang, M. R. V. Moghadam, and R. Zhang, "Magnetic mimo signal processing and optimization for wireless power transfer," IEEE Transactions on Signal Processing, vol. 65, No. 11, pp. 2860-2874, 2017.
G. Zulauf, S. Park, W. Liang, K. N. Surakitbovorn, and J. Rivas-Davila,"C oss losses in 600 v gan power semiconductors in soft-switched, high-and very-high-frequency power converters," IEEE Transactions on Power Electronics, vol. 33, No. 12, pp. 10 748-10 763, 2018.

H. Bai, Z. Nie, and C. C. Mi, "Experimental Comparison of Traditional Phase-Shift, Dual-Phase-Shift, and Model-Based Control of Isolated Bidirectional DC-DC Converters," IEEE Transactions on Power Electronics, vol. 25, pp. 1444-1449, 2010.
H. Hoang, S. Lee, Y. Kim, Y. Choi, and F. Bien, "An adaptive technique to improve wireless power transfer for consumer electronics," IEEE Transactions on Consumer Electronics, vol. 58, No. 2, 2012.
H.-M. Lee, H. Park, and M. Ghovanloo, "A power-efficient wireless system with adaptive supply control for deep brain stimulation," IEEE journal of solid-state circuits, vol. 48, No. 9, pp. 2203-2216, 2013.
I. Aoki, S. D. Kee, D. B. Rutledge, and A. Hajimiri, "Distributed active transformer—a new power-combining and impedance-transformation technique," IEEE Transactions on Microwave Theory and Techniques,vol. 50, No. 1, pp. 316-331, 2002.
J. Hiltunen, V. Väisänen, R. Juntunen, and P. Silventoinen, "Variable-Frequency Phase Shift Modulation of a Dual Active Bridge Converter," IEEE Transactions on Power Electronics, vol. 30, pp. 7138-7148, 2015.
J. Kim, H.-C. Son, D.-H. Kim, and Y.-J. Park, "Impedance matching considering cross coupling for wireless power transfer to multiple receivers," in 2013 IEEE Wireless Power Transfer (WPT). IEEE, 2013,pp. 226-229.
J. Wu, C. Zhao, Z. Lin, J. Du, Y. Hu, and X. He, "Wireless power and data transfer via a common inductive link using frequency division multiplexing," IEEE transactions on industrial electronics, vol. 62, No. 12, pp. 7810-7820, 2015.
K. E. Koh, T. C. Beh, T. Imura, and Y. Hori, "Impedance matching and power division using impedance inverter for wireless power transfer via magnetic resonant coupling," IEEE Transactions on Industry Applications, vol. 50, No. 3, pp. 2061-2070, 2014.
K. Kim, H.-J. Kim, and J.-W. Choi, "Magnetic beamforming with noncoupling coil pattern for high efficiency and long distance wireless power transfer," in Wireless Power Transfer Conference (WPTC), 2017 IEEE. IEEE, 2017, pp. 1-4.
L. Gu, W. Liang, L. C. Raymond, and J. Rivas-Davila, "27.12MHz GaN Bi-directional resonant power converter," in 2015 IEEE 16th Workshop on Control and Modeling for Power Electronics (COMPEL), 2015, pp. 1-7.
L. Shi, Z. Kabelac, D. Katabi, and D. Perreault, "Wireless power hotspot that charges all of your devices," in Proceedings of the 21st Annual International Conference on Mobile Computing and Networking. ACM, 2015, pp. 2-13.
M. Fu, T. Zhang, X. Zhu, P. C.-K. Luk, and C. Ma, "Compensation of cross coupling in multiple-receiver wireless power transfer systems," IEEE Transactions on Industrial Informatics, vol. 12, No. 2, pp. 474-482, 2016.
M. Huang, Y. Lu, U. S. P, and R. P. Martins, "22.4 A reconfigurable bidirectional wireless power transceiver with maximum-current charging mode and 58.6% battery-to-battery efficiency," in 2017 IEEE International Solid-State Circuits Conference (ISSCC), 2017, pp. 376-377.
M. K. Ranjram, I. Moon, and D. J. Perreault, "Variable-inverter-rectifier-transformer: a hybrid electronic and magnetic structure enabling adjustable high step-down conversion ratios," IEEE Transactions on Power Electronics, vol. 33, No. 8, pp. 6509-6525, 2018.
M. Liu, S. Liu, and C. Ma, "A High-Efficiency/Output Power and Low-Noise Megahertz Wireless Power Transfer System Over a Wide Range of Mutual Inductance," IEEE Transactions on Microwave Theory and Techniques, vol. 65, pp. 4317-4325, 2017.
M. Nakamura and H. Torii, "Ternary phase shift keying and its performance,"in Wireless Personal Multimedia Communications, 2002. The 5th International Symposium on, vol. 3. IEEE, 2002, pp. 1284-1288.
M. W. Baker and R. Sarpeshkar, "Feedback Analysis and Design of RF Power Links for Low-Power Bionic Systems," IEEE Transactions on Biomedical Circuits and Systems, vol. 1, pp. 28-38, 2007.
M. Xiong, M. Liu, Q. Zhang, Q. Liu, J. Wu, and P. Xia, "Tdma inadaptive resonant beam charging for iot devices," IEEE Internet of Things Journal, vol. 6, No. 1, pp. 867-877, 2019.
S. Aldhaher, D. C. Yates, and P. D. Mitcheson, "Design and Development of a Class EF2 Inverter and Rectifier for Multimegahertz

(56) References Cited

OTHER PUBLICATIONS

Wireless Power Transfer Systems," IEEE Transactions on Power Electronics, vol. 31, pp. 8138-8150, 2016.

S. Ge, W. Lisarinao, Q. Zhang, L. Jian, and Y. Chen, "Frequency-division technique for simultaneous wireless power transfer to two receivers," in Computational Electromagnetics (ICCEM), 2016 IEEE International Conference on. IEEE, 2016, pp. 127-128.

S. Li, W. Li, J. Deng, T. D. Nguyen, and C. C. Mi, "A Double-Sided LCC Compensation Network and Its Tuning Method for Wireless Power Transfer," IEEE Transactions on Vehicular Technology, vol. 64, pp. 2261-2273, 2015.

S. Y. Chu and A. T. Avestruz, "Transfer-power measurement: A non-contact method for fair and accurate metering of wireless power transfer in electric vehicles," in 2017 IEEE 18th Workshop on Control and Modeling for Power Electronics (COMPEL), 2017, pp. 1-8.

U. K. Madawala and D. J. Thrimawithana, "Current sourced bi-directional inductive power transfer system," IET Power Electronics, vol. 4, pp. 471-480, 2011.

W. J. Chudobiak and D. F. Page, "Frequency and power limitations of Class-D transistor amplifiers," IEEE Journal of Solid-State Circuits, vol. 4, pp. 25-37, 1969.

W. Liu, K. Chau, C. H. Lee, C. Jiang, W. Han, and W. Lam, "Multifrequency multi-power one-to-many wireless power transfer system," IEEE Transactions on Magnetics, 2019.

X. Zan and A.-T. Avestruz, "27.12 mhz bi-directional wireless power transfer using current-mode class d converters with phase-shift power modulation," in 2018 IEEE PELS Workshop on Emerging Technologies: Wireless Power Transfer (Wow). IEEE, 2018, pp. 1-6.

X. Zan and A.-T. Avestruz, "Wireless power transfer for implantable medical devices using piecewise resonance to achieve high peak-to average power ratio," in 2017 IEEE 18th Workshop on Control and Modeling for Power Electronics (COMPEL). IEEE, 2017, pp. 1-8.

"Optimal design of a wireless power transfer system with multiple self-resonators for an led tv," IEEE Transactions on Consumer Electronics, vol. 58, No. 3, 2012.

\* cited by examiner

MULTIPLE ACCESS WIRELESS POWER TRANSFER

CROSS-REFERENCE TO RELATED APPLICATION

This application claims the benefit of U.S. provisional application entitled "Multiple Access Wireless Power Transfer," filed Jul. 5, 2018, and assigned Ser. No. 62/694,277, the entire disclosure of which is hereby expressly incorporated by reference.

BACKGROUND OF THE DISCLOSURE

Field of the Disclosure

The disclosure relates generally to wireless power transfer.

Background

Wireless power transfer is burgeoning because of convenience, durability, and in many cases, necessity. Contemporary applications include the charging of portable consumer electronics, biomedical implants, and electric vehicle charging. The advent of the Internet of Things (IoT) has unlocked a world of massively interconnected devices with challenges that draw a considerable amount of research towards architectures in and scalability of wireless communications. However, a research gap is widening in scalable wireless power transfer to support these new architectures. Conventional wireless power transfer is intrinsically one-to-one because multiple transmitters and receivers operating at the same frequency in the same physical space with few exceptions mutually couple and interfere with each other. Architectures having multiple transmitters and multiple receivers for wireless power transfer have not yet approached scaling to possibly thousands of devices.

The proliferation of wireless power transfer is also raising challenges in cybersecurity. For example, conventional single-frequency wireless power transfer is vulnerable to an attacker with a powerful transmitter whose goal is to overwhelm or eviscerate a receiver. Another vulnerability is communications that may be embedded in wireless power transfer. A chaotic variation in frequency has been used to make wireless power transfer secure. However, frequency hopping over a small discrete set of frequencies is still vulnerable to attack by multiple transmitters from a determined aggressor.

Additional concerns motivate wireless power transfer to extend beyond the single frequency transfer of power. Regulatory restrictions require wireless power to reside within a narrow frequency band, which carries a number of consequences. The granularity of the frequency bands render frequency optimization for the wide range of wireless power transfer applications difficult. Single frequency operation also limits the bandwidth for communication. For example, at 6.78 MHz frequency operation, the allowed bandwidth is only 30 kHz. Narrow bandwidths impose tight tolerances on resonant components translating to 0.9% for inductors and capacitors at 6.78 MHz, driving cost and complexity to stave off reductions in performance. This also makes the power transfer less tolerant to changes in transfer distances and orientation because of the accompanying variation in magnetic coupling coefficient with the associated alteration of inductances. Several methods have been explored to operate outside of ISM bands, including frequency modulation, random modulation, pulse position modulation, and spread spectrum frequency dithering.

Direct-sequence spread-spectrum wireless power transfer (DSSS-WPT) endeavors to operate optimally across a wide band of frequencies using different codes to circumvent many of the single-frequency limitations. DSSS-WPT allows non-interfering multiple transmitters and multiple receivers while being largely immune to attacks. The modulation provided by DSSS-WPT offers a wider bandwidth for communications embedded in wireless power transfer.

SUMMARY OF THE DISCLOSURE

In accordance with one aspect of the disclosure, a device configured for wireless power transfer includes a digital controller configured to generate a plurality of switch control signals, and a transceiver configured to generate a wireless signal for the wireless power transfer. The transceiver includes a plurality of switches, each switch of the plurality of switches being responsive to a respective switch control signal of the plurality of switch control signals such that the wireless signal has a waveform shaped in accordance with a code sequence for the wireless power transfer. The code sequence is one of a set of predetermined code sequences, each predetermined code sequence being orthogonal to each other predetermined code sequence of the set of predetermined code sequences.

In another aspect of the disclosure, a method for wireless power transfer from a transmitter of a wireless power transfer pairing to a receiver of the wireless power transfer pairing includes generating, by a digital controller of the transmitter, a plurality of switch control signals in accordance with a code sequence for the wireless transfer pairing, and transmitting, by a transceiver of the transmitter, a wireless signal for the wireless power transfer to the receiver, the transceiver including a plurality of switches, each switch of the plurality of switches being responsive to a respective switch control signal of the plurality of switch control signals such that the wireless signal has a waveform shaped in accordance with the code sequence. The code sequence is one of a set of predetermined code sequences, each predetermined code sequence being orthogonal to each other predetermined code sequence of the set of predetermined code sequences.

In yet another aspect of the disclosure, a method for wireless power transfer from a transmitter device of a wireless power transfer pairing to a receiver device of the wireless power transfer pairing includes detecting, by the receiver device, the transmitter device, the transmitter device transmitting a wireless signal for the wireless power transfer, the wireless signal having a waveform shaped in accordance with a code sequence for the wireless transfer pairing, and generating, by a digital controller of the receiver device, a plurality of switch control signals in accordance with the code sequence for the wireless transfer pairing to receive, by a transceiver of the receiver device, the wireless signal. Each switch control signal of the plurality of switch control signals is provided to a respective switch of a plurality of switches of the transceiver such that a current or a voltage is generated in the transceiver, the current or the voltage having a waveform shaped in accordance with the code sequence. The code sequence is one of a set of predetermined code sequences, each predetermined code sequence being orthogonal to each other predetermined code sequence of the set of predetermined code sequences.

In still another aspect of the disclosure, a system for wireless power transfer includes a transmitter device including a transceiver, the transceiver being configured to generate a wireless signal, the wireless signal having a waveform shaped in accordance with a code sequence for the wireless power transfer, and a receiver device including a transceiver, the transceiver being configured to generate a current or a voltage, the current or the voltage having a waveform shaped in accordance with the code sequence. The code sequence is one of a set of predetermined code sequences, each predetermined code sequence being orthogonal to each other predetermined code sequence of the set of predetermined code sequences.

In still yet another aspect of the disclosure, a transceiver for wireless power transfer includes a plurality of switches, each switch being referenced to ground, a plurality of resonant tank circuits, each resonant tank circuit of the plurality of resonant tank circuits being connected to a respective pair of the plurality of switches, and one or more coupling elements coupled to the plurality of resonant tank circuits and configured to either generate or receive a wireless signal. Each switch of the plurality of switches is responsive to a respective switch control signal such that a waveform generated at the one or coupling elements is shaped in accordance with a code sequence for the wireless power transfer.

In connection with any one of the aforementioned aspects, the transceivers, devices, systems, and methods may alternatively or additionally include any combination of one or more of the following aspects or features. The digital controller is configured to adjust the plurality of switch control signals such that the waveform is synchronized with a waveform of a further transceiver. The digital controller is configured to receive an instruction indicative of the code sequence. Each predetermined code sequence of the set of predetermined code sequences includes a concatenation of multiple code elements. The multiple code elements are selected from a plurality of orthogonal code elements. The transceiver is configured to receive a further wireless signal. The digital controller is further configured to determine the code sequence based on the further wireless signal. The further wireless signal has a waveform shaped in accordance with a respective code sequence of the set of predetermined code sequences. The digital controller is further configured to synchronize the wireless signal with the further wireless signal. The transceiver includes a plurality of resonant tank circuits, each resonant tank circuit of the plurality of resonant tank circuits being connected to a respective pair of the plurality of switches. Each resonant tank circuit of the plurality of resonant tank circuits is configured as a current mode, Class D converter. The plurality of switches and the plurality of resonant tank circuits are arranged such that the transceiver is configured as a four-quadrant current mode Class D transceiver. The resonant tank circuits in at least a subset of the plurality of resonant tank circuits have different resonant frequencies. The transceiver further includes a plurality of coupling elements, each coupling element of the plurality of coupling elements generating a respective portion of the wireless signal. Each resonant tank circuit of the plurality of resonant circuits is disposed between one of the plurality of coupling elements and a respective pair of the plurality of switches. Each coupling element of the plurality of coupling elements is driven by a respective pair of the plurality of resonant circuits. The resonant circuits in each respective pair of the plurality of resonant circuits are not synchronized with one another. The digital controller includes a modulator, the modulator being configured to modulate the waveform relative to the code sequence. The modulator is configured to shift a phase of a portion of the code sequence to modulate the wireless power transfer, or to transmit information via the wireless power transfer. The modulator is configured to skip a portion of the code sequence to modulate the wireless power transfer, or to transmit information via the wireless power transfer. The code sequence is a ternary code sequence. The ternary code sequence includes a positive polarity code, a negative polarity code, and a zero code. The positive and negative polarity codes have durations about three times longer than the zero code. The transceiver is configured, via a further plurality of switch control signals provided to the plurality of switches, to generate a current or voltage having a waveform shaped in accordance with a further code sequence of the set of predetermined code sequences for receipt of power via a further wireless signal. A charging device including a plurality of transmitter devices, wherein each transmitter device of the plurality of transmitter devices is configured as a device as claimed herein. Each transmitter device of the plurality of transmitter devices transmits in accordance with a respective code sequence of the set of predetermined code sequences. A relay charging device including a transmitter device configured as a device as claimed herein, and further including a receiver device configured to receive an external wireless power signal, the receiver device being coupled to the transmitter device, the receiver device including a digital controller configured to generate a plurality of switch control signals, and a transceiver configured to generate a current or a voltage, the transceiver including a plurality of switches, each switch of the plurality of switches being responsive to a respective switch control signal of the plurality of switch control signals such that the current or the voltage has a waveform shaped in accordance with a further code sequence of the set of predetermined code sequences. The charging device further includes a direct current (DC) bus coupling the transmitter device and the receiver device for power transfer therebetween. The receiver device and the transmitter device are coupled wirelessly via a wireless power transfer pairing in which the receiver device acts as a transmitter and the transmitter device acts as a receiver. The method further includes selecting, by the digital controller of the transmitter, the code sequence from the set of predetermined code sequences. The method further includes receiving, by the transceiver of the transmitter, a further wireless signal, and determining, by the digital controller of the transmitter, the code sequence based on the further wireless signal. The further wireless signal is received from the receiver. The method further includes, by the digital controller of the transmitter, synchronizing the wireless signal with the further wireless signal. The further wireless signal has a waveform shaped in accordance with a respective code sequence of the set of predetermined code sequences. The method further includes modulating, by the digital controller of the transmitter, the waveform relative to the code sequence. Modulating the waveform includes shifting a phase of a portion of the code sequence to modulate the wireless power transfer, or to transmit information via the wireless power transfer. Modulating the waveform includes skipping a portion of the code sequence to modulate the wireless power transfer, or to transmit information via the wireless power transfer. The method further includes receiving, by the transceiver of the transmitter, a further wireless signal from the receiver, the further wireless signal being shaped in accordance with a respective code sequence of the set of predetermined code sequences, and demodulating, by the digital controller of the transmitter, the further wireless signal to determine data being communicated by the receiver. The method further includes selecting, by the receiver device, the code sequence from the set of predetermined code sequences. The method further includes determining, by the receiver device, the code sequence based on the wireless signal. Detecting the transmitter device includes detecting the wireless signal. Detecting the transmitter device includes detecting a synchronization signal. The method further includes relaying power captured via reception of the wireless signal to a further transmitter device, the further transmitter device being configured for wireless power transfer via a further wireless signal having a waveform shaped in accordance with a further code sequence of the set of predetermined code sequences. Relaying the power includes delivering the power via a direct current (DC) bus coupling the receiver device and the further transmitter device. Relaying the power includes delivering the power wirelessly via a further wireless power transfer pairing in which the receiver device acts as a transmitter and the transmitter device acts as a receiver. The transmitter device, the receiver device, or both the transmitter device and the receiver device include a memory in which the set of predetermined code sequences is stored. The transceivers of the transmitter device and the receiver device are identical. The transceiver of the transmitter device or the transceiver of the receiver device includes a plurality of resonant tank circuits, each resonant tank circuit of the plurality of resonant tank circuits being configured as a current mode, Class D converter. The transceiver of the transmitter device includes a plurality of coupling elements, each coupling element of the plurality of coupling elements generating a respective portion of the wireless signal. The transceiver of the transmitter device includes a plurality of switches, each switch of the plurality of switches being responsive to a respective switch control signal such that the waveform shaped in accordance with the code sequence. Each resonant tank circuit of the plurality of resonant circuits is disposed between one of the plurality of coupling elements and a respective pair of the plurality of switches. The transmitter device is one of a plurality of transmitter devices of the system. A respective wireless signal generated by each transmitter of the plurality of transmitter devices has a waveform shaped in accordance with a respective code sequence of the set of predetermined code sequences. Each resonant tank circuit of the plurality of resonant tank circuits is configured as a current mode, Class D converter. The plurality of switches and the plurality of resonant tank circuits are arranged such that the transceiver is configured as a four-quadrant current mode Class D transceiver. The resonant tank circuits in at least a subset of the plurality of resonant tank circuits have different resonant frequencies. Each resonant tank circuit of the plurality of resonant circuits is disposed between a respective coupling element of the one or more coupling elements and a respective pair of the plurality of switches such that each coupling element generates or receives a respective portion of the wireless signal. Each coupling element of the one or more coupling elements is driven by a respective pair of the plurality of resonant circuits. The resonant circuits in each respective pair of the plurality of resonant circuits are not synchronized with one another. The code sequence is a ternary code sequence. The coupling element includes an antenna. The coupling element includes an inductor. The coupling element includes a capacitor. The coupling element includes a waveguide.

BRIEF DESCRIPTION OF THE DRAWING FIGURES

For a more complete understanding of the disclosure, reference should be made to the following detailed description and accompanying drawing figures, in which like reference numerals identify like elements in the figures.

Figure 1:
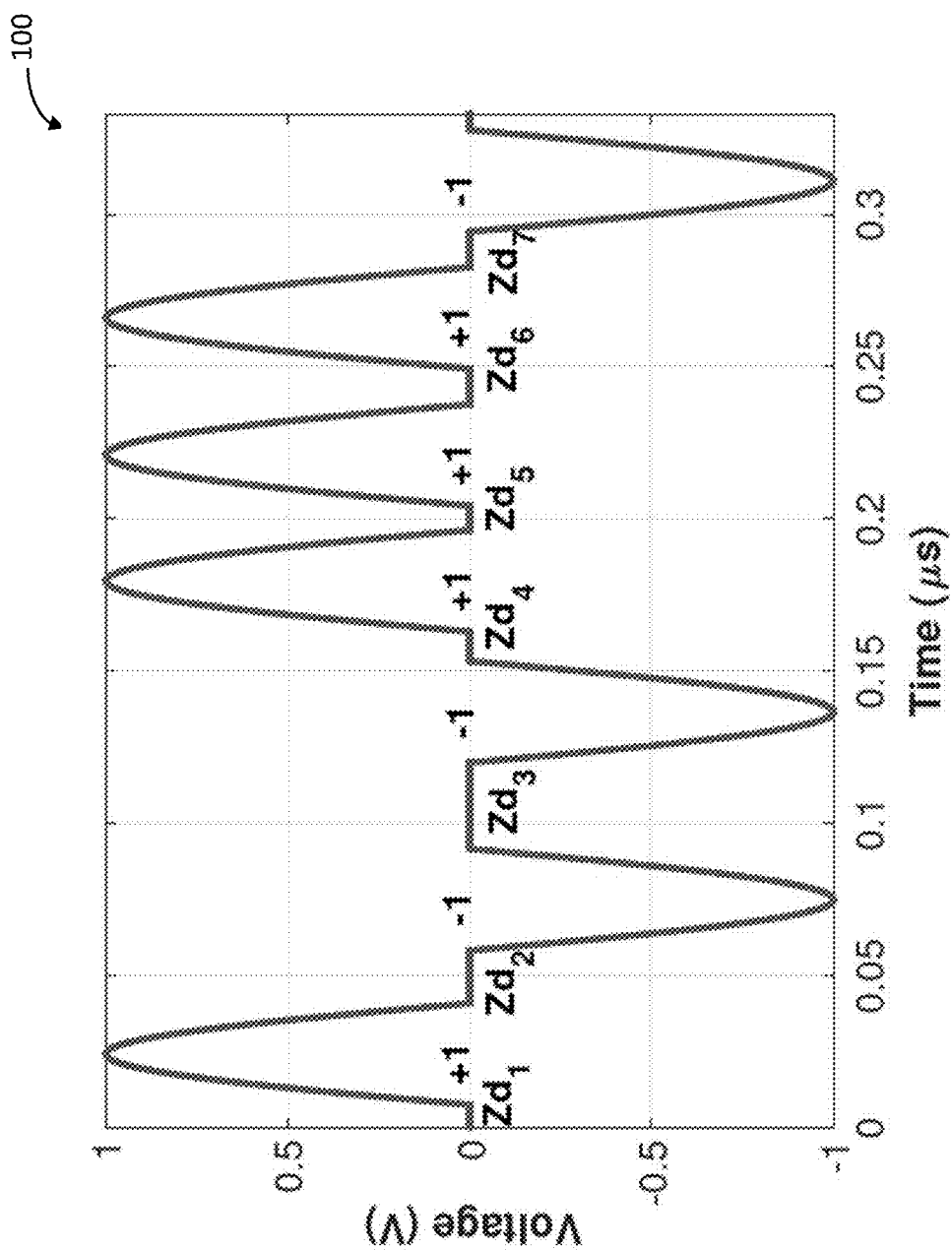
FIG. 1 is a waveform shaped in accordance with a code sequence for wireless power transfer in accordance with one example.

The disclosed devices, systems, and methods are susceptible of embodiments in various forms. Specific embodiments are illustrated in the drawing and will hereafter be described with the understanding that the disclosure is intended to be illustrative. The disclosure is not intended to limit the invention to the specific embodiments described and illustrated herein.

DETAILED DESCRIPTION OF THE DISCLOSURE

Described above are transceivers, devices, systems, and methods for multiple access wireless power transfer. Code division multiplexing through orthogonal code sequences, is used to support multiple actors and access. The orthogonality of the code sequences allows multiple actors to operate simultaneously within the same frequency range. The WPT may thus be considered to provide "multiple access," as that term is used in connection with code division multiple access (CDMA) communications. A fundamental difference relative to CDMA in communications is that every transmitter and receiver in WPT is capable of inadvertently transferring power bi-directionally. Furthermore, under certain conditions of power transfer, there can be small amounts of interference similar to what happens in communications when information is encoded. The orthogonality of the code sequences allows wireless power transfer to be realized while avoiding undesired interaction with other actors.

One challenge with multiple access wireless power transfer stems from the electromagnetic coupling and that both transmitters and receivers are by nature bidirectional in terms of energy flow. This is true for both near-field and far-field wireless power systems in use today. The interface to the electromagnetic fields is both passive and reciprocal. In near field systems, the interface consists of a coupling inductor or capacitor (depending on the power transfer type (H-field or E-field)) along with a matching network. In far-field systems, the interface consists of an antenna and a matching network. These reciprocal and passive systems both reflect, store, and pass power with a similar characterization in power electronics in terms of real and reactive power. While examples described below focus on magnetic near-field systems, the disclosed devices, systems, and methods may use far-field systems (e.g., antennas), capacitive/electric-field coupling, and/or electromagnetic coupling through waveguides as well.

The orthogonality of the code sequences allows a wide variety of wireless power transfer scenarios to be achieved. For example, one such scenario involves one transmitter to many receivers, in which the code sequences of the receivers are sufficiently matched to the code sequence of the transmitter to receive power, but are orthogonal to one another to avoid undesired interactions. In another example, wireless power transfer is achieved from many transmitters to one receiver, in which the code sequences of the transmitters are orthogonal to one another, but sufficiently matched to the code sequence of the receiver to achieve the desired power transfer. In another example, the code sequences are shift-orthogonal, which is a specific case of orthogonality, with one another. Still other examples present scenarios involving many transmitters and many receivers.

Disclosed herein are transceivers configured for multiple access wireless power transfer, as well as transmitter, receiver, and charging devices utilizing one or more of such transceivers, or other transceivers. Methods and systems for multiple access wireless power transfer are also described. The methods and systems may include the transceivers and devices described herein, and/or other transceivers and devices.

The transceivers, transmitters, receivers, devices, systems, and methods described herein are well-suited for use in connection with wireless power transfer for peer-to-peer charging scenarios. But the disclosed transceivers, transmitters, receivers, devices, systems, and methods may also be used in other wireless power transfer applications, such as electric vehicle charging. Power may be wirelessly transferred to a variety of other loads. The nature of the load, power, source, and other characteristics of the environment in which the power transfer occurs may vary considerably. The disclosed transceivers, transmitters, receivers, devices, systems, and methods may be used in a wide variety of applications, including, for instance, consumer devices, medical implants, and systems having distributed sensors, such as autonomous vehicles.

In some cases, the topology of the transceivers may vary considerably from the examples described herein. For instance, the transceivers are not limited to inductive coupling or charging. Topologies that use capacitive or antenna-based coupling or charging may also be used. The topology of the transceivers may vary across devices. In still other cases, the wireless power transfer may involve devices without a transceiver, such as devices configured for only reception or transmission of the wireless power. For example, transmitter devices may be configured as described in Avestruz, et al., "Quad-switch push-pull (QSPP) RF amplifier with direct, simultaneous modulation of phase and pulse position for spread-spectrum power applications," IEEE Applied Power Electronics Conference and Exposition (APEC) (2015), the entire disclosure of which is incorporated by reference. Further optional transmitter and receiver devices are described in U.S. Patent Publication No. 2019/0013699 ("Switched Receiver for Wireless Power Transfer"), the entire disclosure of which is also hereby incorporated by reference.

There are currently two approaches to multiple access in WPT: orthogonal and non-orthogonal. Non-orthogonal approaches accept coupling and interference among transmitters and receivers and rely on stringent control or optimization to maintain power distribution and stability. Prevailing orthogonal approaches minimize interference by separating the power signals in time, space, or frequency; in scaling, these approaches suffer from different types of complexity or limitations in peak power, proximity, or spectrum, respectively. Code division multiplexing in wireless power transfer systems is an orthogonal method that is promising for scalable multiple access. Multiple access WPT allows many-to-many wireless power transfer with minimal or no interference using different encodings on the wireless power transfer waveforms.

Scalability has been a persistent barrier to the intersection of WPT with the Internet of Things (IoT). These densely connected networks of electronic devices require the ability to exchange power as freely as they can exchange information. Existing approaches for multiple access often involve cumbersome additional circuitry, complex feedback techniques, or dedicated slots in time, frequency, or space. These methods suffer from drawbacks and limit the scalability of WPT. The present disclosure describes how code division multiple access (CDMA) enables scalability in wireless power transfer. A framework for CDMA for WPT is presented herein along with an effective coding scheme and a transceiver design.

WPT is rapidly expanding to application spaces ranging from (but not limited to) charging of portable and wearable electronic devices, biomedical applications, and charging of electric vehicles. The world today has become a densely connected network of devices with remarkable capabilities of communication, sensing and computation that has led to the huge explosion of the IoT. Despite their ubiquity, the functionality of these devices is limited by the availability of portable power, highlighting the utility of scalable multiple access WPT.

The existing techniques for multiple access WPT can be categorized into two fundamental approaches: non-orthogonal and orthogonal. Non-orthogonal approaches do not avoid coupling or interference, but rather use feedback and/or optimization methods to tune the resonant circuits, hence varying the frequency, phase, or voltage to control power transfer. Nonorthogonal methods include the use of impedance matching networks, analytical formulations for power maximization, use of basic compensation techniques, and advanced control techniques. These methods involve either the use of additional control circuits, excessive online computations, or accurately tuned matching networks for successful operation. The control complexity or the computational burden of these methods can limit the scalability.

The traditional orthogonal approach for multiple access WPT involves using dedicated slots in time, frequency, or space for power transfer. Orthogonal methods include the use of techniques like time division multiplexing (TDM), frequency division multiplexing (FDM), or use of spatial decoupling. These methods generally do not involve feedback or difficult computations and hence are often easier to implement. However, TDM only allows users to operate in different time slots, and results in higher switch stress for the same amount of power, because of higher peak-to average ratio. FDM only allows different frequency slots, and is constrained by the limited availability of spectrum. Spatial decoupling methods are constrained by the physical limitations. Given these limitations, these orthogonalization methods do not scale well.

One solution to overcome the individual limitations of TDM and FDM is to use frequency-hopping spread-spectrum (FH-SS) WPT. FH-SS relies on changing the switching frequency (often through the resonant capacitors) in a pseudo-random manner to allow users to share time and frequency slots. However, FH-SS only allows users to operate in pseudo-random time and frequency slots, and the scalability is limited by the number of discrete resonant components that can be dynamically swapped.

Using CDMA to provide the orthogonalization avoids imposing such restrictions.

In digital communications, to overcome the limitations of TDM and FDM, CDMA is employed to improve network capacity. CDMA allows different users to operate simultaneously on the same frequency, at the time, and in the same space (FIG. 1). CDMA, the technology behind 3G communications, relies on spread spectrum techniques for multiple access.

In this disclosure, CDMA is used to enable the scalability of near-field and far-field WPT. CDMA through spread-spectrum modulation can help with decoupling power transfer among multiple agents operating within the same magnetic or electromagnetic space with similar resonant frequencies but different switching sequences. This capability means that CDMA can help expand WPT to a wide variety of devices. Besides improving scalability, CDMA also offers higher tolerance to component variation, ease of embedding communications in WPT, and lower electromagnetic interference. CDMA may be used in combination with direct-sequence spread-spectrum modulation (hereby referred to as spread spectrum modulation) to further enhance WPT.

This disclosure presents an approach for Code Division Multiple Access WPT (CDMA-WPT). In some cases, the multiple access WPT also involves spread spectrum modulation. The basic framework for CDMA-WPT is presented along with examples. A new soft-switching transceiver is presented that supports CDMA, including spread-spectrum modulation.

To implement CDMA-WPT, transceiver voltages or currents are represented by digital codes. One or more soft-switching quasi-resonant converters in the transceiver may be used to create half-sine waves. Examples are described below. These half-sine waves may be represented by a binary code, for example, minimum shift keying. However, it is difficult to control spectrum by only using half-sine waves. By adding zero-durations between the half-sine waves the amplitude levels correspond to a ternary code, which theoretically has better features than binary code for digital modulation. There is a greater ease in manipulating the frequency spectrum by allowing a ternary code with variable zero-durations.

FIG. 1 shows an example of a code sequence 100. In a quasi-resonant transceiver, the output voltages may be represented by a ternary digital code through a polarity vector and a zero duration vector. In the example, the ternary code sequence is P=[1 −1 −1 1 1 1 −1] and Zd=[$Zd_1$ $Zd_2$ $Zd_3$ $Zd_4$ $Zd_5$ $Zd_6$ $Zd_7$]. {$Zd_i$} are in fractions of the polarity period. In some cases (e.g., spread-spectrum modulation cases), these voltages will repeat, but with a very long period, which can be defined as the code period. This code period often corresponds to the lowest resolution bandwidth as defined by regulatory standards. Additional constraints may imposed on these codes for practical reasons. Alternatively or additionally, the voltages of the code sequence are concatenated with one or more additional code sequences.

Various code sequences, and sets of code sequences, may be used with the disclosed transceivers, transmitters, receivers, devices, systems, and methods. Optimization techniques, such as a greedy optimization method, may used to determine a set of code sequences appropriate for use in various applications. The manner in which the code sequences is established may vary from the techniques and methods described herein. For instance, the code sequence may be optimized to maximize efficiency, power transferability, correlation, and/or other characteristics to varying extents. In some cases, the code sequence may be determined on a segment-by-segment basis, in which code sequence segment is orthogonal to each other code sequence segment. Concatenation of the code sequence segments may the be useful to, for instance, accommodate a higher number of actors and/or achieve spread spectrum wireless power transfer.

Figure 2:
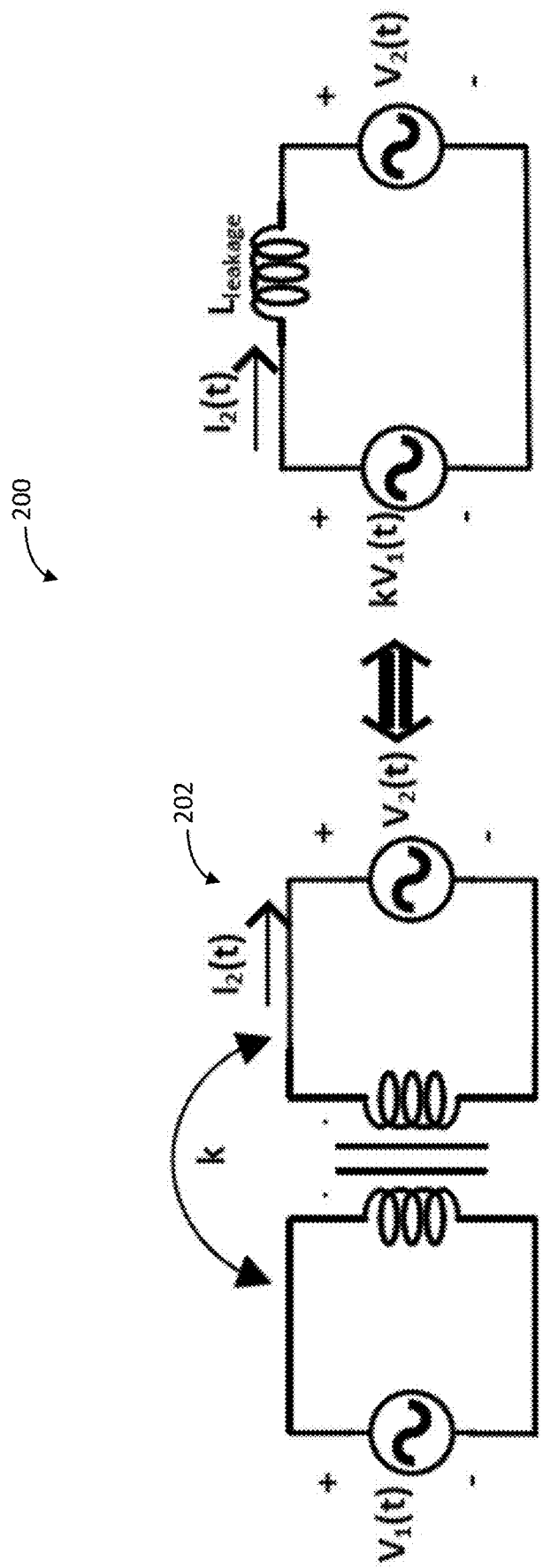
FIG. 2 shows circuit diagram of equivalent circuits of a wireless power transfer system in accordance with one example.

FIG. 2 presents equivalent circuits 200 for understanding the power transfer and flow between a transmitter and a receiver. Bidirectional transceivers, examples of which are described below, may be used to successfully implement CDMA-WPT. To study the power flow between transceivers, a simplified voltage source model shown in FIG. 2 may be used. In this case, the voltage source model includes a receiver-side Thevinen equivalent circuit 202 for steady-state power flow analysis. Voltages $V_1(t)$ and $V_2(t)$ are the voltages of the transmitter and the receiver, $L_{leakage}$ is the leakage inductance of the receiver. Voltages $V_1(t)$ and $V_2(t)$ are half-sine wave sources with variable zero-durations defined by corresponding ternary codes.

The receiver-side current for low coupling coefficient can be approximated as follows.

$$I_2(t) = \int_0^t \frac{-V_2}{L_{leakage}} dt.$$

The power transferred from transmitter to the receiver is as follows.

$$P = \langle V_1(t), I_2(t) \rangle = \frac{1}{T} \int_0^T I_2(t) V_1(t) dt,$$

where T is the code period of the repeating transmitter/receiver voltage. The digital codes are converted to a simple normalized time-domain waveform (e.g., for the $k^{th}$ polarity the voltage is $P_k \sin(t)$ and 0 for the time $Zd_k$) and the relationship between these simplified waveforms is used to understand power transfer. To understand the power flow between $i^{th}$ and $j^{th}$ transceivers, we define the power factor between the transceivers as follows.

$$p_{ij} = \frac{\langle V_i(t), I_j(t) \rangle}{\|V_i\| \|I_j\|} = \frac{\left\langle -\frac{dV_i(t)}{dt}, V_j(t) \right\rangle}{\left\| \frac{dV_i(t)}{dt} \right\| \|V_j\|}$$

where the $\langle \cdot, \cdot \rangle$ is defined over the period of transceiver voltages. Since WPT is a reciprocal system $p_{ij} = -p_{ji}$. The sign of the power factor governs the direction of power flow between two transceivers. If $p_{ij} > 0$, power flows from $i^{th}$ transceiver to $j^{th}$ transceiver; if $p_{ij} < 0$, power flows from $j^{th}$ transceiver to $i^{th}$ transceiver; and if $p_{ij} = 0$, no power flows, which defines orthogonality between transceivers.

Optimization Procedures and Sample Cases. To illustrate CDMA-WPT, a number of examples are presented to demonstrate proof of principle of the concepts and the robustness of the analysis to the non-idealities and higher order effects. In the following analysis, the transceivers are synchronized. Synchronization may address one or more timing-related aspects of the waveforms and code sequences, including, for example, when the code sequence starts, the time base of the code sequence, and the code width. But in other cases, code sequences may be used that do not involve synchronized transceivers (for example, using shift-orthogonal codes where timing of where the code sequences may not matter). In this example, all the transceivers are considered identical, but, in other cases, non-identical transceivers may be used. In still other cases, devices may be unidirectional.

Example—Single-Input, Single-Output (SISO) with maximum power transfer. Given a single transmitter ($TRX_1$) and a single receiver, the objective is to obtain a receiver code ($TRX_2$) that can receive maximum power from the given transmitter. Power factor $p_{12}$ is the normalized power factor with $TRX_1$ as transmitter and $TRX_2$ as receiver. The objective is to maximize power (hence $p_{12}$) from transmitter ($TRX_1$) to receiver ($TRX_2$).

The example optimization problem for obtaining the receiver code can be formulated as follows.

$$\underset{P_2, Zd_2}{\text{maximize}}\, p_{12}(P_2, Zd_2) \tag{1}$$

subject to $$\sum_{i=1}^N P_2^i = 0, \tag{2}$$

$$\sum_{i=1}^N Zd_2^i = \sum_{i=1}^N Zd_1^i, \tag{2}$$

$$P_2^i \in (-1, 1), i = 1, \ldots, N. \tag{3}$$

$$P_2^{4i-3} + P_2^{4i-2} + P_2^{4i-1} + P_2^{4i} = 0, i = 1, \ldots, \frac{N}{4} \tag{4}$$

$$Zd_{min} \leq Zd_i \leq Zd_{max}, i = 1, \ldots, \frac{N}{4} \tag{5}$$

$$Zd_i \in Z_+, \tag{6}$$

where $p_{12}$ is the power factor between transceivers—1 and 2, $P_2$ and $Zd_2$ are the unknown polarity vector, and the zero duration vectors for transceiver—2 and N is the number of half sinusoids (polarities) in the given transceiver sequence. The constraints are enforced by the transceiver design and can be interpreted as follows:

1) No net flux over the code period
2) Transceivers should have the same code period
3) The polarity vector can only have binary values
4) Flux constraints; allowing only maximum flux excursion of 2
5) Zdi is bounded above and below. The minimum value that corresponds to the time resolution of the switching controller and the maximum value corresponds to the lowest resolution bandwidth.
6) Zdi is a positive integer.

The objective function is non-convex and non-linear, so a variety of optimization tools may be used to find an optimal solution. In some cases, the toolbox provided by MATLAB may be used. The manner in which the code sequence is determined may differ in other cases. For instance, a greedy optimization algorithm for active receivers may also be used to find an optimal receiver sequence.

Orthogonal Transceivers. In this case, orthogonal code sequences are determined such that the transceivers are non-interfering. The goal is to find a transceiver code that neither receives nor transmits power to the given transceiver.

The example objective function to obtain the transceiver code that minimizes the following function over the polarities P2 and zero durations Zd2.

$$\|P_{12}(P_2, Zd_2)\|.$$

The constraints on the polarity and zero-duration vector are the same as that for the previous case. The inner product is again defined over the code period.

Figure 3:
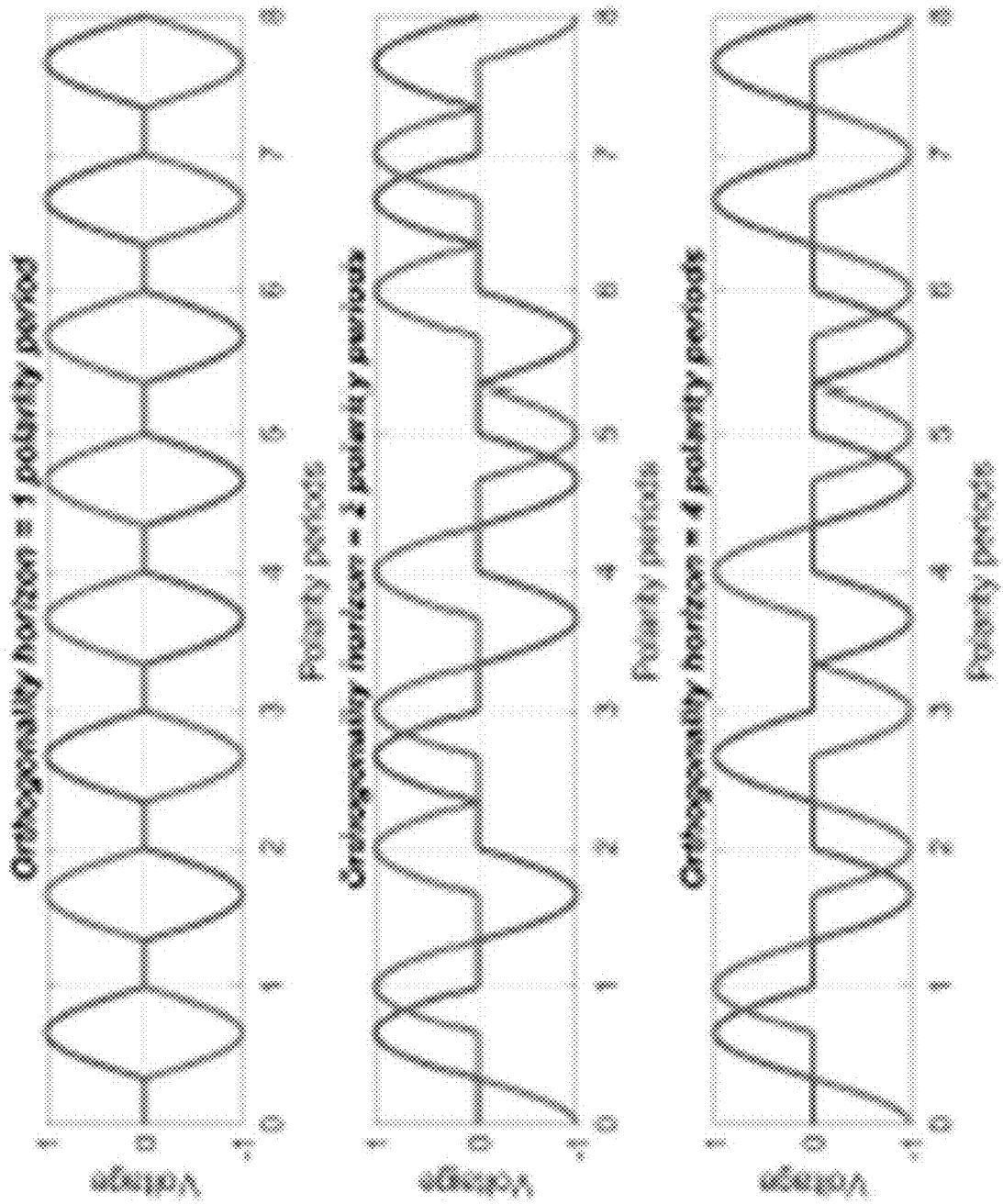
FIG. 3 shows plots of orthogonal code sequences over one or more polarity periods for wireless power transfer in accordance with three examples.

There are different notions of orthogonality depending on the instantaneous power exchange between the two transceivers. Orthogonal transceivers transfer zero average power over code period, but the instantaneous power may not necessarily be zero. For instance, the instantaneous power from TRX$_1$ to TRX$_2$ may be positive for half the code period and negative over the other half code period. Similarly, the instantaneous power may also be positive for some smaller intervals and negative for some other intervals to make the average power zero. This notion of orthogonality over different time horizons is useful for creating multiple non-interacting transceivers in the same space. For illustration, consider a transceiver pattern with uniform Zd and define the kth polarity period as a period of the half-sine wave and the previous zero-duration. Then orthogonality on a horizon length of N polarity periods means that the instantaneous power is positive for N/2 successive polarity periods and is negative for the remainder N/2 polarity periods. FIG. 3 depicts examples of orthogonal, non-interfering transceiver code sequence waveforms with different horizons of orthogonality. However, as the horizon length for orthogonality increases, the amount of reactive power carried by each transceiver may also increase.

Example—Multiple-Input, Multiple-Output (MIMO). In this case, two transmitters are transferring power to two receivers with an objective of developing two non-interacting WPT networks. The first WPT network is Tx1 to Rx1. The second WPT network is Tx2 to Rx2. The objective is to transfer power from one transceiver to its own receiver and have no crosstalk between the two networks irrespective of the relative position of each network to the other.

One technique to obtain the codes for each transceiver in the MIMO case is as follows:
1) Start with a transmitter (Tx1).
2) Find an orthogonal transmitter (Tx2 with horizon length of 2 polarity periods
3) Find receivers (Rx1 and Rx2) for the two orthogonal transmitters For steps (2) and (3), the optimization described herein may be used. If the receivers are selected to be phase-shifted versions of the transmitters, then the receivers will also be orthogonal to each other. To add more WPT networks, the orthogonality horizon may be increased and the corresponding transceiver codes may be obtained.

Figure 4:
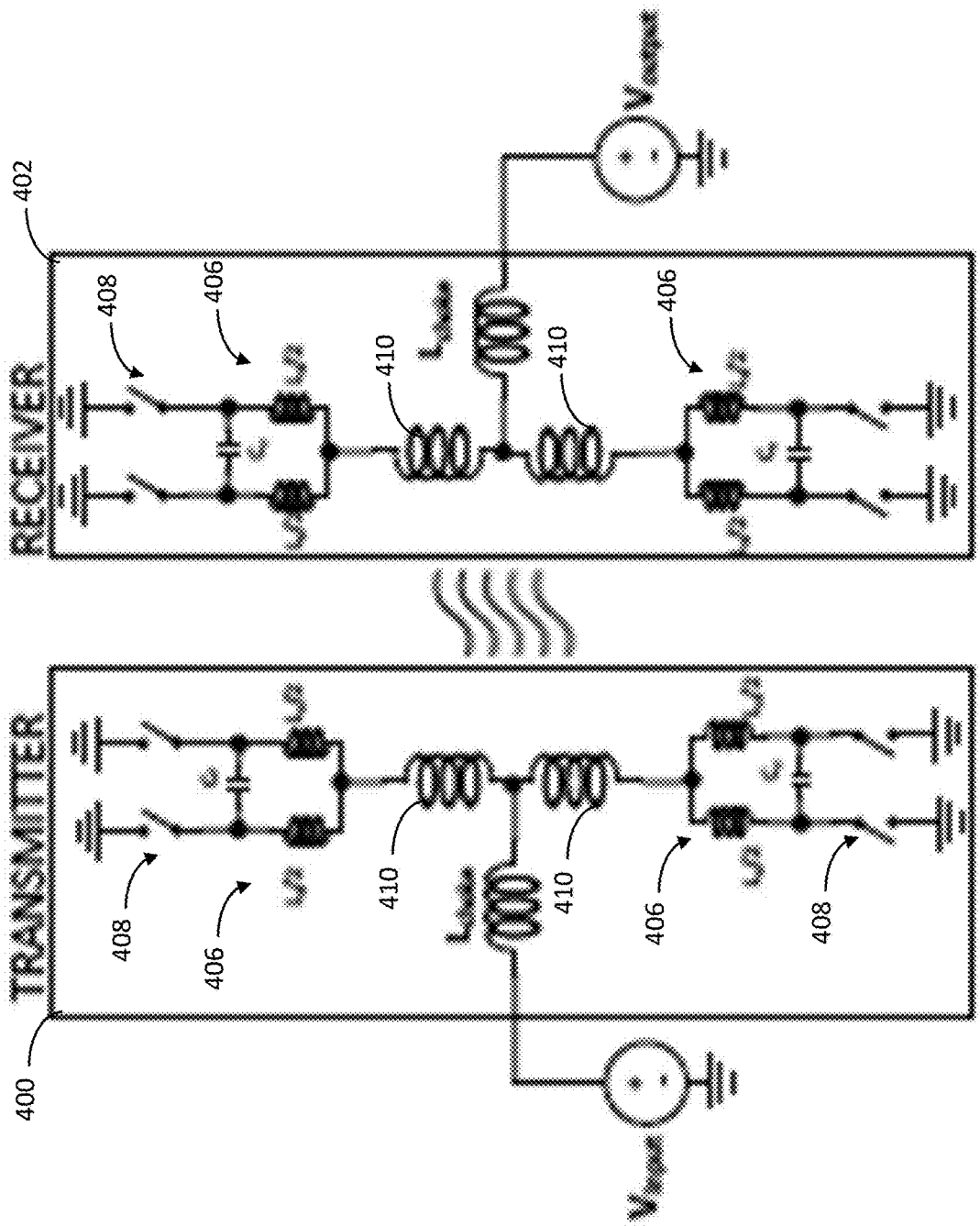
FIG. 4 is a circuit diagram of a system having transmitter and receiver devices with bidirectional transceivers configured for wireless power transfer in accordance with one example.

FIG. 4 depicts an example of end-to-end, multiple access WPT between a pair of transceivers 400, 402. In this case, the transceivers 400, 402 have identical current-mode topologies. Current-mode topologies are useful for the realization of ternary voltage sequences because of the ease of freezing the inductor states while allowing zero voltage switching (ZVS) at every transition. The quad push-pull amplifier described in the above-referenced paper is one such topology, which allows for arbitrary placement of half-sine wave pulses without using transformers which limit the efficiency and the operational frequency. In this case, each transceiver 400, 402 includes a 4-quadrant current-mode class-D (4Q-CMCD) transceiver, which overcomes these limitations. Each transceiver 400, 402 may achieve ZVS over wide load range, and absorbs the switch parasitic capacitances in the resonance.

Each transceiver 400, 402 includes two push-pull amplifiers 406. One push-pull amplifier creates a positive half-sine wave and the other creates a negative half sine wave. Each transceiver can thus realize ternary sequences as needed for multiple access WPT.

Each push-pull amplifier includes a pair of switches 408. The switches dictate the realizable ternary codes and the power transfer levels among transceivers. The steady state voltage across the WPT coils is set by the dc voltage source, switch breakdown voltage and ratio of the inductance of WPT coil to the resonant tank inductance. The current flow through the WPT coils is limited by the resonant tank inductance and the maximum allowable rms switch current. Hence, the power flow is dictated by the choice of switch.

In the example of FIG. 4, each transceiver 400, 402 includes two WPT coils 410 for inductive coupling. The coil arrangement may differ in other cases, as shown and described herein. For instance, fewer or additional coils may be used. Other types of coupling elements may alternatively or additionally be used, including, for instance, capacitive and antenna coupling elements.

Figure 5:
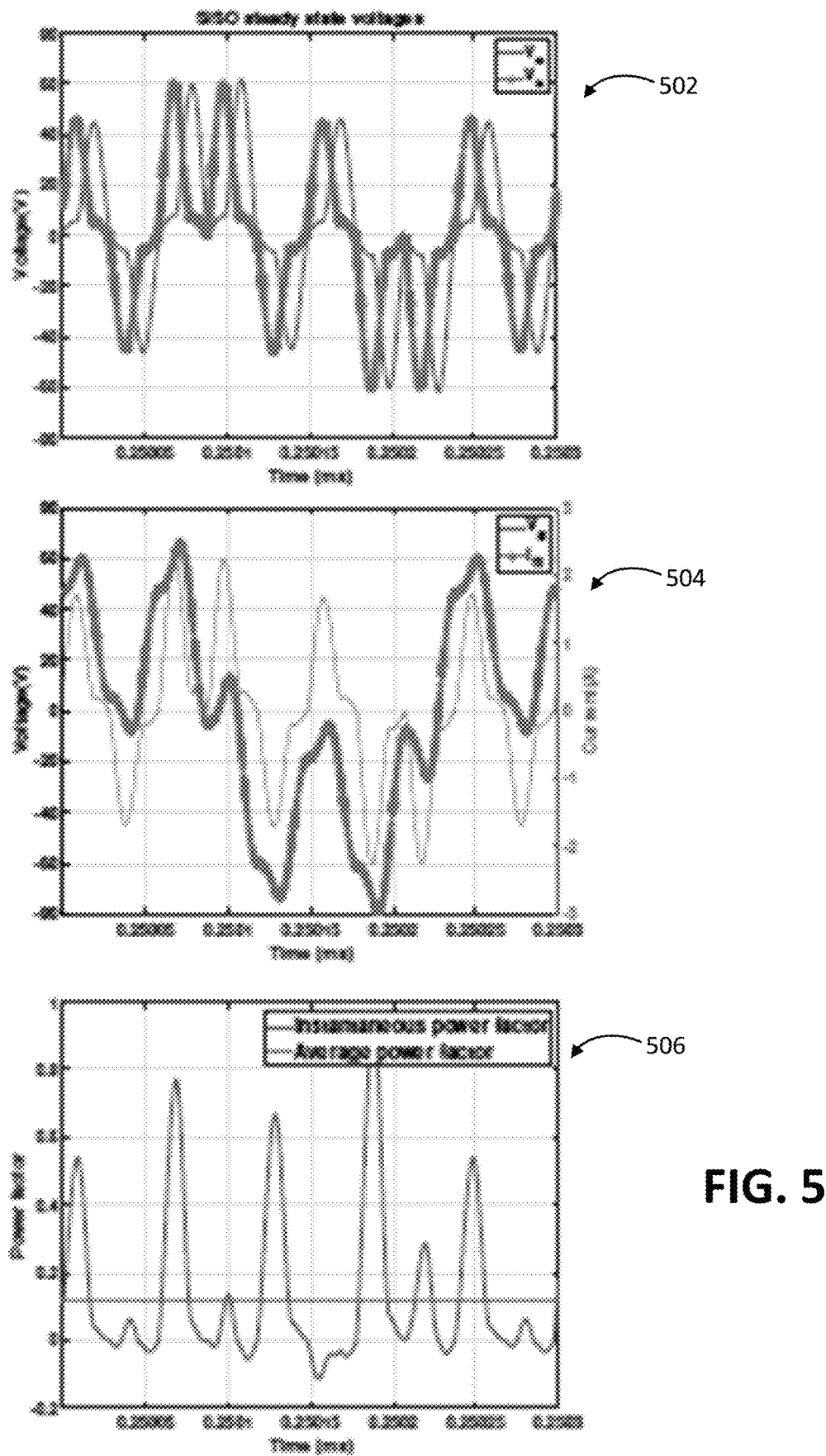
FIG. 5 shows plots of transmitter and receiver voltages, receiver current, and power factor for maximum single-input, single-output wireless power transfer in accordance with one example.
Figure 6:
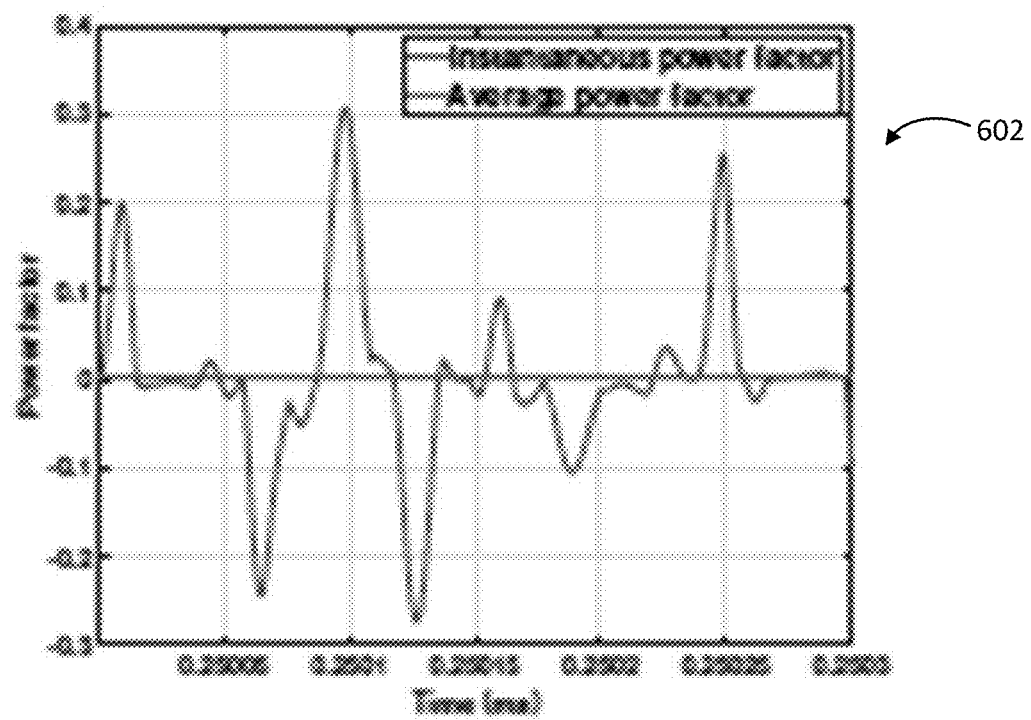
FIG. 6 shows plots of orthogonal receiver current and transmitter voltage, and the resulting power factor, for minimized interaction in accordance with one example.
Figure 6:
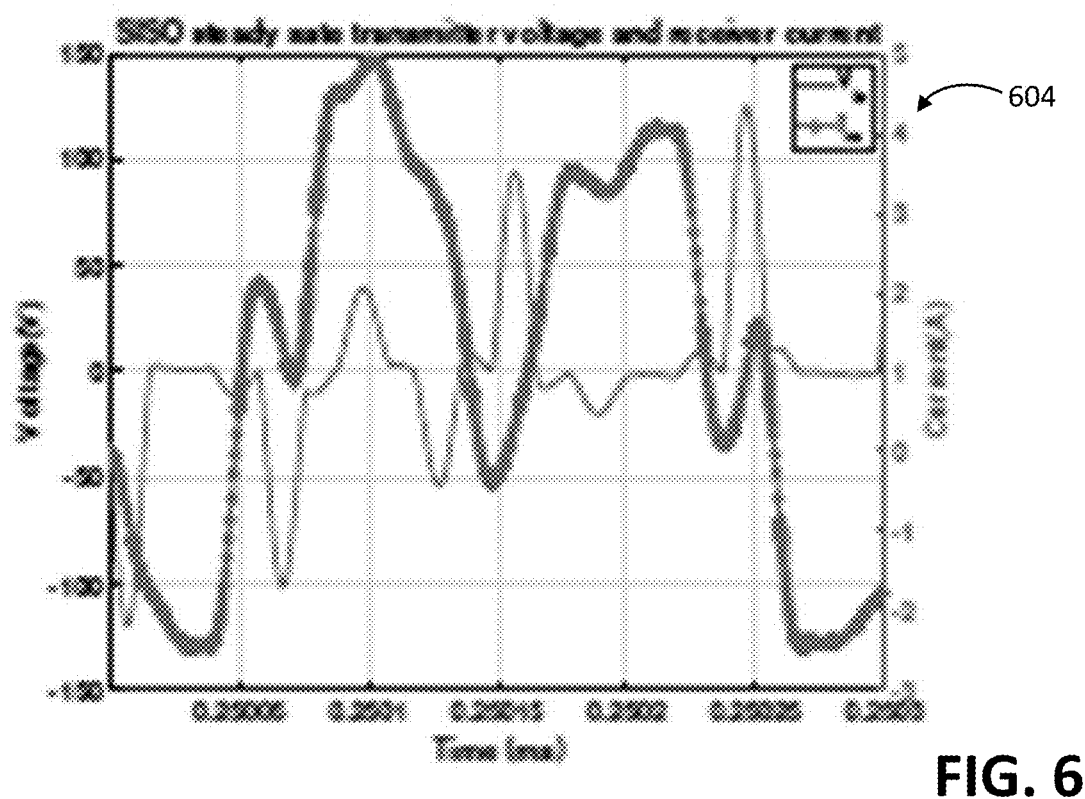
Figure 7:
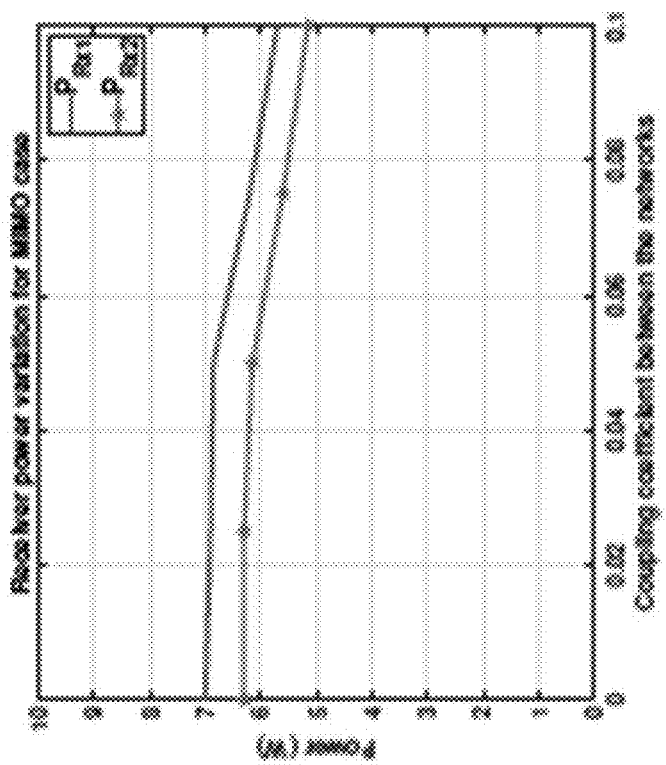
FIG. 7 is a plot of received power for a multiple-input, multiple-output case as a function of coupling coefficient in accordance with one example.

Simulation results for the above-described examples are presented in connection with FIGS. 5-7. FIGS. 5 and 6 show the results of SISO simulation for maximum power transfer and non-interfering transceivers. FIG. 7 shows the results of the MIMO simulation.

For the simulations, an EPC-2019 GaN FET (Coss 110 pF and Rds 50 m) is selected as the candidate switch for 10 W end-to-end power transmission capability using the 4Q-CMCD transceiver. Other transistors may be used, including other GaN transistors. Table I represents the simulation parameters for each transceiver. For demonstration, only 16-polarity long sub-sequences of a longer spread-spectrum sequence were considered.

TABLE I

| SIMULATION PARAMETERS | |
|---|---|
| Parameter | Value |
| $L_r$ | 190 nH |
| $Q_{L_r}$ (1 MHz) | 24 |
| $L_{WPT}$ | 228 μH |
| $Q_{L_{WPT}}$ (1 MHz) | 72 |
| $C_r$ | 50 pF |
| $L_{choke}$ | 30 μH |
| $V_{dc}$ | 14 V |
| k | 0.2 |

FIG. 5 depicts a plot 502 of transmitter and receiver voltage waveforms that maximize power transfer. The voltage waveforms are approximately half sinusoids with minor disturbances. FIG. 5 also depicts a plot 504 of the receiver current waveform. The plot 504 shows that the receiver current is in phase with the transmitter voltage, hence maximizing the received power from the transmitter. FIG. 5 still further depicts a plot 506 of the power factor between the transmitter and the receiver such that power transfer is maximized.

For maximizing power transfer, a spread spectrum or other transmitter is used to generate a code sequence such as the voltage waveform shown in FIG. 5. Using the optimization described hereinabove or another procedure, a code sequence is selected for a spread-spectrum or other receiver. In this case, the code sequences for the transmitter and the receiver are the same, albeit with a phase shift in the voltage waveforms. The plot 502 of FIG. 5 verifies the ternary code realization by both the transmitter and receiver. The plots 504, 506 of FIG. 5 show by maximizing the power factor p12 between the transmitter and receiver, the receiver current remains in phase with the transmitter voltage, thereby maximizing the power transfer.

The instantaneous power factor corresponds to the instantaneous power flow from TRX1 to TRX2, which is mostly positive, thus maximizing average power factor, hence the average transferred power from TRX1 to TRX2. For the parameters shown in Table-I and EPC-2019 switch, 7 Watts of power are received from the transmitter by the receiver.

FIG. 6 shows an example of minimizing power transfer with orthogonal transceivers, i.e., transceivers having orthogonal waveforms. For the code sequence generated at the spread-spectrum transceiver (TRX1), an orthogonal transceiver code sequence is obtained. In this example, the orthogonality between the code sequences for the two transceivers is defined or established over a horizon of two polarity periods. A plot 602 of FIG. 6 shows that the power factor is indeed minimized. A plot 604 of FIG. 6 shows the orthogonality of the TRX2 current waveform to the TRX1 voltage waveform. Minimal interaction between the transceivers is therefore achieved.

FIG. 7 depicts the results of the MIMO simulation. For the transceivers orthogonal over a horizon length of 2, the corresponding receivers that receive maximum power are found. Now the coupling coefficient between the two WPT networks, i.e. the coupling coefficient between any two transceivers except for a dedicated transmitter-receiver pair is varied. FIG. 11 shows the variation of receiver power levels as the network coupling coefficient is varied. The maximum power variation observed is 1 W. For small enough coupling between the two networks, the power levels remain almost constant, thereby verifying the successful MIMO operation for a densely-connected WPT system of two transmitters and two receivers.

Variation of the receiver power levels for the MIMO case as the coupling coefficient between the WPT networks is varied. The change in power level is up to 10% for loosely-coupled MIMO networks.

Described above is the concept of code orthogonality in wireless power transfer. The disclosed transceivers, devices, and systems use this code orthogonality to address scalability in WPT. Multiple access WPT not only involves transceivers interacting in time, frequency, and space, but also in the code-domain, thereby adding another dimension. A procedure to construct ternary code sequences for transceivers is also described. The interactions among transceivers are then established by the respective code sequences. The corresponding waveforms for the respective code sequences are then realized through soft-switching 4-quadrant common mode, Class D (CMCD) and other transceivers. Analysis along with examples have been presented for CDMA-WPT to demonstrate its effectiveness for scalability. Thus, CDMA is powerful tool that can be used for fulfilling the ubiquity of WPT and enabling the seamless flow of power.

Figure 8:
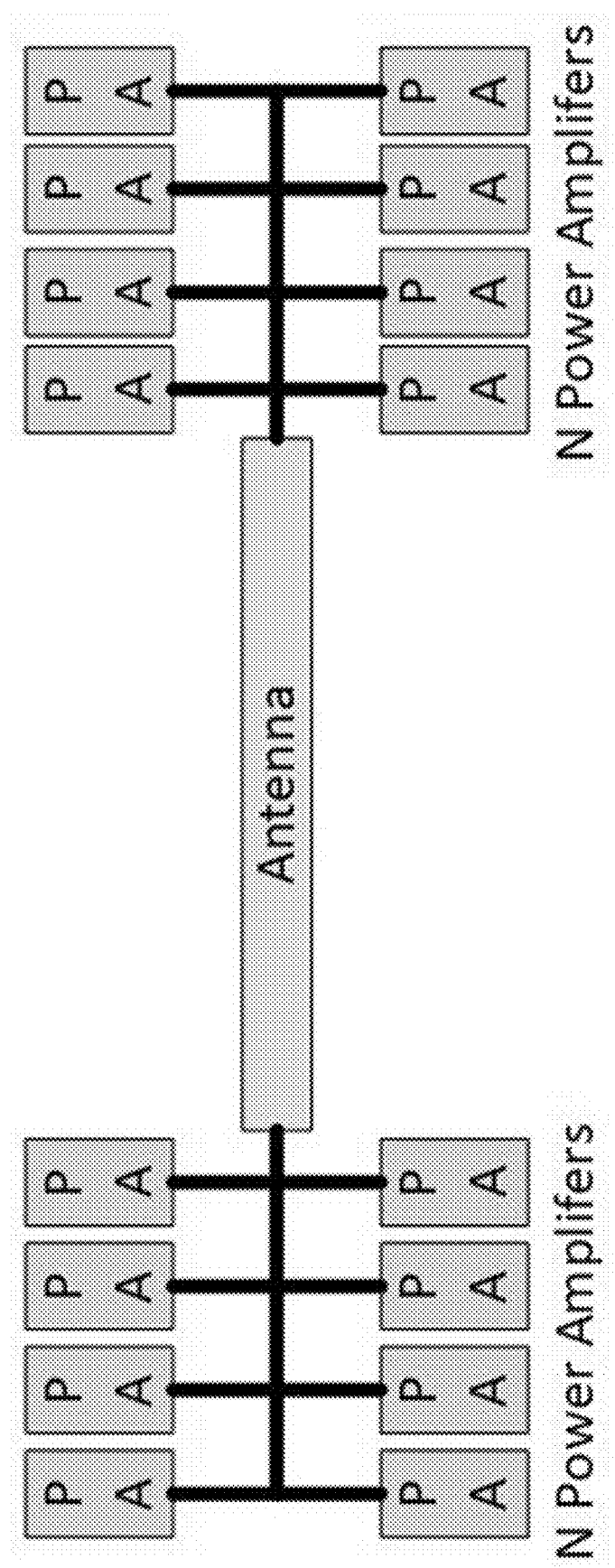
FIG. 8 is a block diagram of a transceiver having a plurality of current mode converters connected to an antenna coupling element in accordance with one example.

FIG. 8 depicts a distributed amplifier architecture for realizing the waveforms of the code sequences. In some cases, the architecture is capable of generating 900 MHz center-frequency waveforms through integrated circuits and power-efficient encoding. The 900 MHz frequency is chosen as a compromise between penetration through building materials and hardware miniaturization, but additional or alternative frequencies may be used. The platform may be spread-spectrum and bi-directional in power and information.

The distributed amplifier architecture allows any number of stages to be disposed on either side of the coupling element. The single-stage topology examples described above has a single resonant tank circuit on either side of the coupling element. A two-stage topology adds another resonant tank circuit on each side of the coupling element, and so on. The architecture is modular. So any number of stages may be provided in parallel.

In one example, the following components were used to realize each resonant tank circuit and the switches connected thereto.

Switch used—GS61008p (V=100V, Coss=250 pF, Rdson=7 m-ohm

Resonant Inductor Lr=360 nH, R_Lr=0.06 ohm, (Q=38@1 MHz)

Resonant capacitor=2 nF

An inductor may be used as the coupling element. In one example, the coupling inductor was Lwpt=270 nH, R_wpt=0.015 (Q=113@1 MHz). Other components and component values may be used. The code sequence had uniform zero duration segments. Each zero duration segment had a length such that the duty cycle was 75%. The length of the zero duration segments may vary and, in some cases, be non-uniform.

With those components, a single-stage example achieved an efficiency of 34% with a DC input voltage of 8 V, a power output of 4.36 Watts, and a power input of 12.81 Watts. A two-stage example with a coupling inductance of 135 nH but otherwise same configuration achieved an efficiency of 34.2% and a power output of 8.67 Watts from a power input of 25.43 Watts. A three-stage example with a coupling inductance of 90 nH achieved an efficiency of 33% and a power output of 12.58 Watts from a power input of 38.12 Watts.

As the number of stages were increased, the configuration of the resonant tank remained the same in each stage. So each tank roughly contributed the same amount of power. So power output for N-similar stages is N*P, where P is the power output of single stage. The WPT inductor is also scaled accordingly.

The configuration of these transceiver examples may vary. For example, the hardware can be optimized for higher efficiencies as the number of stages is increased to achieve a desired output power level.

Figure 10:
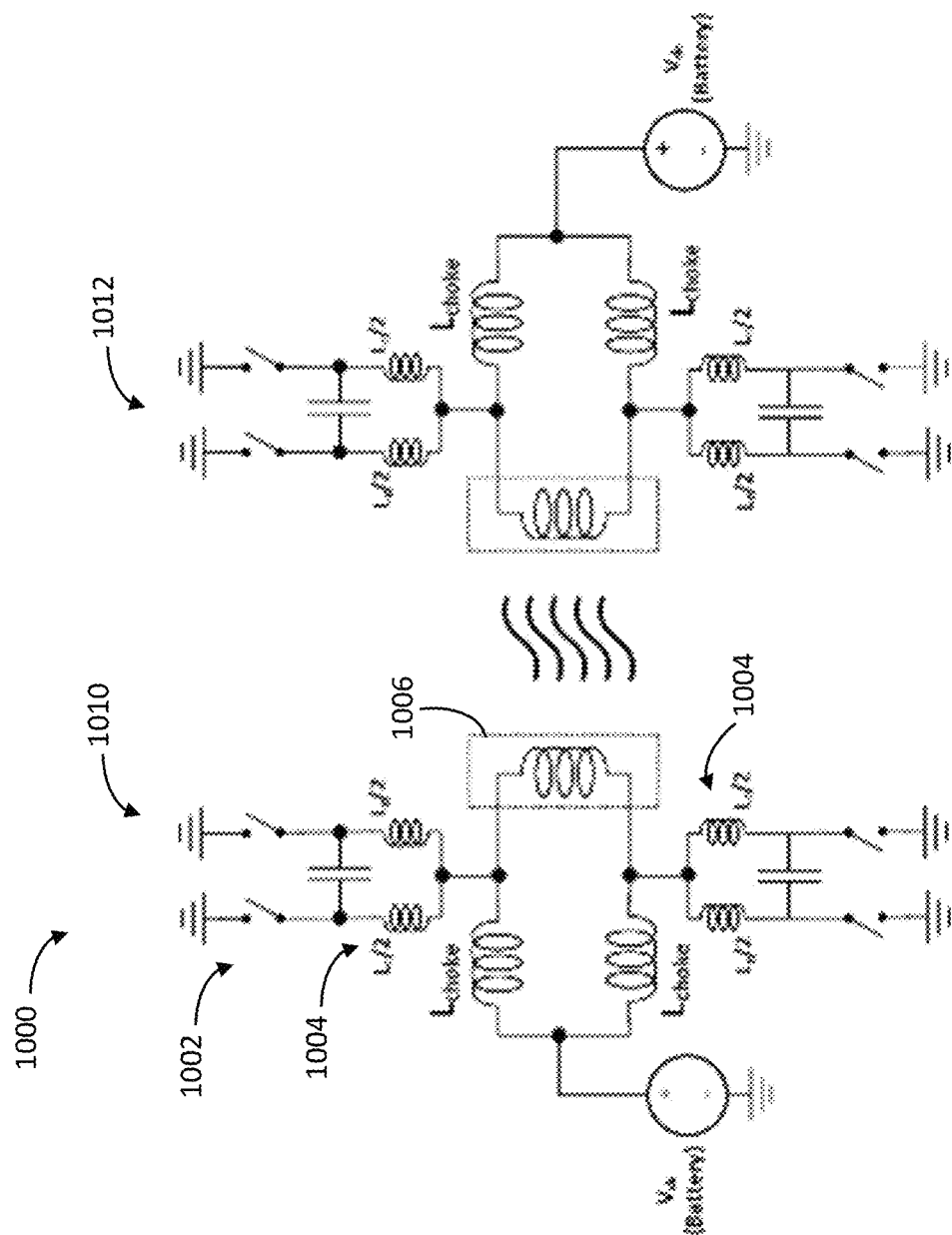
FIG. 10 is a circuit diagram of transmitter and receiver devices with bidirectional transceivers having a pair of current mode converters connected to an inductor coupling element for wireless power transfer in accordance with one example.

FIG. 10 depicts another transceiver architecture 1000 that may be used in connection with any of the multiple access WPT devices, systems, and methods described herein. The transceiver architecture addresses compromises and tradeoffs in multiple access WPT involving power, efficiency, and the number of actors. For instance, the power is limited at the point of maximum efficiency and is constrained by the number of actors. The transceiver architecture may overcome the tradeoffs by increasing the effective voltage across the transmitter. In one aspect, the transceiver architecture may be considered to introduce an active segregated inductor. Examples described below with up to four actors demonstrate the effectiveness of the transceiver architecture, including a two-fold increase in power level with similar efficiencies. As with the other transceivers described herein, the transceiver architecture depicted in FIG. 10 is directed to implementing code division multiple access WPT, which, as described herein, relies on decoupling in the code space to avoid interference. Using coding to achieve decoupling, each actor can occupy the same slot in time, frequency, or space.

As with the transceiver of FIG. 4, the transceiver 1000 of FIG. 10 includes a plurality of switches 1002, a plurality of resonant tank circuits 1004, and one or more coupling elements 1006 coupled to the plurality of resonant tank circuits. Each switch is referenced to ground as shown. Each resonant tank circuit is connected to a respective pair of the plurality of switches. As described herein, each switch of the plurality of switches is responsive to a respective switch control signal. As a result, a waveform generated at the one or coupling elements is shaped in accordance with a code sequence for the wireless power transfer.

Each resonant tank circuit 1004 is configured as a current mode, Class D converter. In this case, the plurality of switches and the plurality of resonant tank circuits are arranged such that the transceiver is configured as a four-quadrant current mode Class D transceiver. In some cases, the resonant tank circuits in at least a subset of the plurality of resonant tank circuits have different resonant frequencies, an example of which is described and shown in connection with FIG. 18.

The coupling element(s) 1006 are coupled to the plurality of resonant tank circuits and configured to either generate or receive a wireless signal. In this example, the transceiver includes a single inductive coupling element.

The transceiver of FIG. 10 differs from the transceiver of FIG. 4 in the manner in which how the chokes, resonant circuits, and voltage sources are connected. In FIG. 4, only one choke is used, and the WPT inductor coil is center-tapped. In FIG. 10, two choke inductors are used, and the WPT inductor coil is contiguous. The choice of one versus the other depends on the design of the WPT coils, physical size constraints, frequency of operation, and efficiency of the WPT coils and choke coils, among others factors. Further details regarding these and other aspects of the transceiver of FIG. 10 are set forth below.

Current-mode topologies, like the topology of the transceiver architecture of FIG. 10, are more suited for realizing the digital codes of CDMA-WPT due to the ease of freezing the inductor current between the resonances. The conventional current-mode class-D (CMCD), however, lacks the capability to realize arbitrary digital codes. Variants of the CMCD topology can be used for the realization of more ternary codes. However, these current-mode topologies have a limited power output at the peak efficiency due to the tradeoff between conduction loss and device output capacitance, $C_{OSS}$ loss in these topologies. Also, the number of actors in CDMA-WPT necessarily equals the number of digital codes that can be realized by the transceivers. The realization of codes is dependent on the ratio of energy stored in the transceiver to the energy that can be exchanged with the other transceivers. Higher energy stored in the transceiver leads to a larger number of codes that can be realized, but lower power exchanged among transceivers. Hence, there is a trade-off between the number of actors and the power transfer between transceivers.

Set forth below is a description of (i) an example of the coding and power transfer methodology in CDMA, (ii) an example of the hardware for CDMA and the tradeoffs associated therewith, (iii) an example of the active segregated inductor (ASI) structure for addressing the tradeoffs, and (iv) the results from a hardware verification of an example of the ASI structure.

Figure 9:
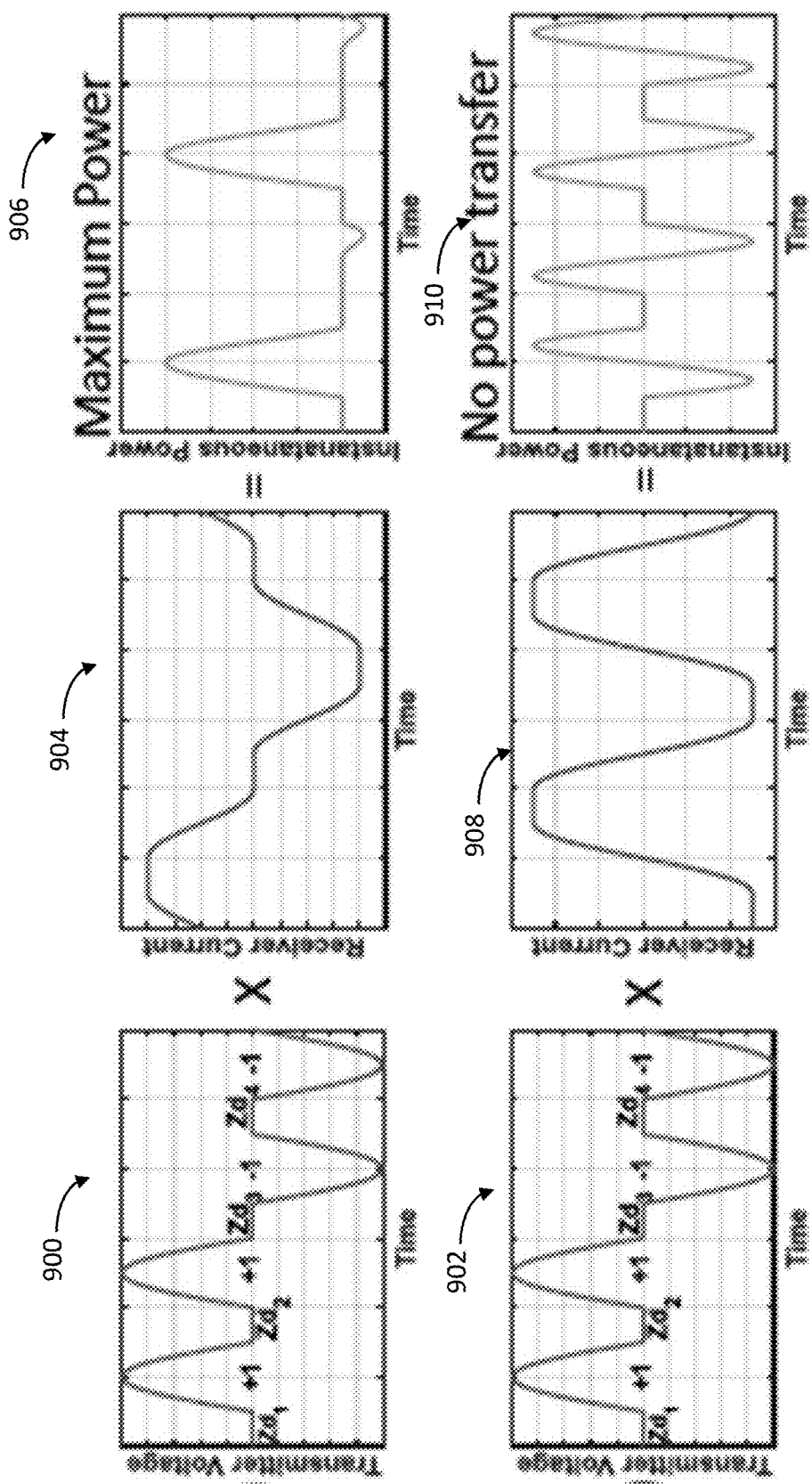
FIG. 9 shows plots of ternary voltage code sequences for a transmitter and corresponding receiver current resulting in maximum power transfer, as well as plots of transmitter voltage and corresponding receiver current for no power transfer, in accordance with one example.

FIG. 9 depicts another example of code sequences for implementing multiple access WPT. The example of FIG. 9 shows that, in some multiple access cases, the receiver current waveform may not match the transmitter voltage waveform. In the example of FIG. 9, maximum power transfer is achieved for a ternary voltage waveform despite differences between the voltage and current waveforms.

Plots 900, 902 show an example of a ternary voltage code with polarity vector, P=+1, +1, −1, −1, with a zero-duration vector of Zd=Zd1, Zd2, Zd3, Zd4. Plot 904 shows the current waveform for an ideal receiver for power transfer in connection with transmission of the code sequence of the plots 900, 902. Plot 906 shows the instantaneous power exchange between the transmitter and receiver resulting from the voltage and current waveforms of the plots 900, 904.

Plot 908 shows a current waveform for an orthogonal receiver, i.e., a receiver implementing a code sequence orthogonal to the code sequence of the plots 900, 902. Plot 910 shows the instantaneous power transferred from transmitter to the receiver. The instantaneous power for the orthogonal transceivers is not 0, but the average power is 0.

With reference again to FIG. 10, an end-to-end CDMA-WPT system with multiple quadrant, or extended, CMCD topology is shown. The system includes transceivers for both a transmitter 1010 and a receiver 1012. The transceivers 1000 of the transmitter 1010 and the receiver 1012 are identical. The power transfer may thus be bidirectional. In each transceiver 1000, the WPT inductor is driven by the two CMCD resonant tanks 1004. One tank can be used to create a positive half-sine wave and the other tank can be used to create a negative half-sine wave. For example, to realize a positive half-sine wave, one of the switches 1002 in the first tank 1004 is opened, and all of the other switches remain closed. The opening of the switch creates a resonance on in the respective tank that, in turn, creates the positive half-sine wave across the WPT inductor. The other switches are then opened in a similar manner to create either a second positive half-sine wave or a negative half-sine wave. As in the other CMCD topology described herein, during a zero duration segment, all four switches are closed, hence the inductor states are frozen. To create a polarity, one of the switches of the appropriate CMCD tank is opened while all the other switches remain closed. During the realization of a polarity, the WPT inductor along with the common-mode CMCD inductor appears in parallel with one of the resonating CMCD inductors.

The number of actors for multiple access WPT depends on the number of orthogonal ternary codes that can be realized using the extended CMCD topology. The realization of a ternary code depends on the ratio of the WPT inductor to the isolated CMCD tank inductor. From an energy point of view, during each polarity, the WPT inductor transfers energy from one CMCD tank to the other and the magnitude of energy transferred depends on the actual value of the inductances. If the WPT inductor is large, then the energy transferred is small, hence a large number of codes can be realized because the energy of the CMCD tanks remains almost constant. If the WPT inductor is small, the energy transfer between the CMCD tanks is large, hence one needs keep track of the energy in the tanks to realize any ternary code.

The power that can be transferred between two transceivers depends on the power factor between them and the peak voltage and current of the WPT inductor. A higher ratio of stored energy to transferred energy makes it easier to realize a number of codes, but reduces the power that can be transferred. A smaller ratio leads to improved power transfer, but with the likelihood of realizing fewer codes and, hence, a limitation on the number of actors.

Figure 11B:
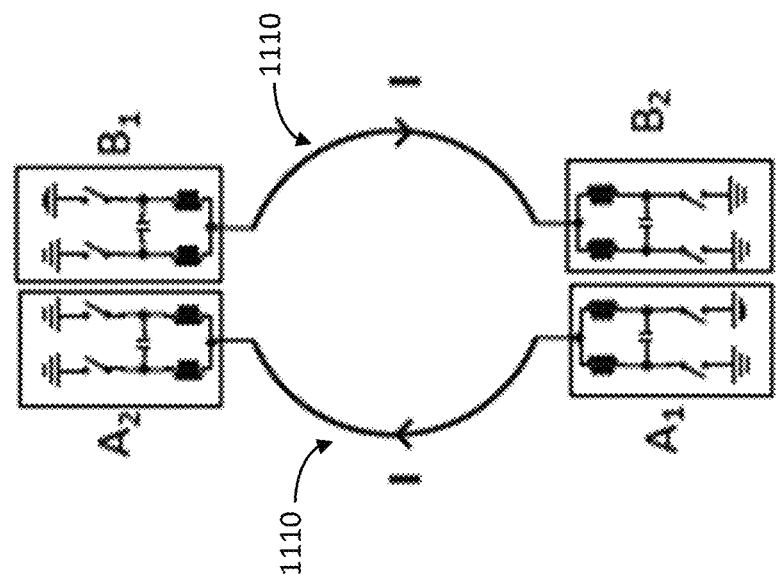
FIGS. 11A and 11B are circuit diagrams of non-segregated and segregated transceiver topologies in accordance with two examples.
Figure 11A:
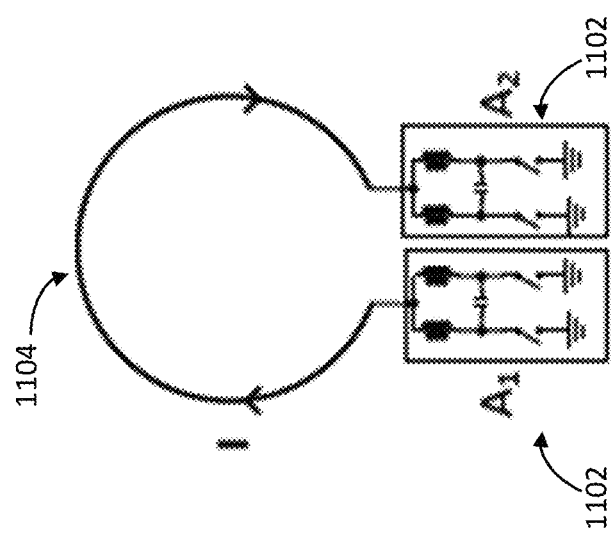

The transceivers of FIG. 10 may be modified to address this tradeoff. The topology includes a distributed active structure illustrated via the circuit diagrams of FIGS. 11A and 11B. FIG. 11A depicts a pair of CMCD circuits 1102 of a transceiver 1100 connected to a WPT coil 1104 in an extended CMCD topology, as described above in connection with, for instance, the transceiver of FIG. 10. The modules depicted in FIG. 11A may be stacked along the same axis with each other so the flux from each module's current I is combined. This plurality of modules may operated as a single transceiver, hence the individual wireless power transfer coils from each module may be considered as an individually driven segment of a larger aggregate WPT inductor. FIG. 11B, by comparison, breaks up the WPT coil into two coils 1110 on the same plane. The segregation of the WPT inductor is described further below.

To break the above-referenced trade-offs, the WPT inductor is segregated into multiple parts with each part acting as the extended CMCD (the ASI topology). FIG. 11B shows an example of ASI with a single turn WPT inductor split into two parts, but further segregation may be presented in other cases. With ASI, the WPT inductor is split into multiple parts, each driven by the extended CMCD topology. In the two-segment ASI structure of FIG. 11B, the WPT inductor is split into two inductors, with one inductor driven by resonant (e.g., CMCD) tanks A1 and A2, and the other inductor driven by resonant tanks B1 and B2. As a result, each resonant tank circuit is disposed between a respective coupling element and a respective pair of the plurality of switches such that each coupling element generates or receives a respective portion of the wireless signal. Each coupling element is thus driven by a respective pair of the plurality of resonant circuits The resonant tanks A1 and B1 have matching voltages, and the resonant tanks A2 and B2 have matching voltages. This matched operation ensures that the currents in the segregated WPT inductor are of the same magnitude and direction as it would be for an unsegregated inductor. But the resonant circuits in each respective pair of the plurality of resonant circuits are not synchronized with one another.

The active segregated inductor (ASI) structure of the transceiver of FIG. 11B has the potential to overcome these shortcomings related to the hardware realization of CDMA-WPT. The basic idea behind the ASI structure is to segregate the transmitter coil inductor into multiple parts with each part being driven by an active source. By segregating the inductor and driving each section independently, the transmitter voltage is added multiple times in the transmitter loop, hence the effective voltage across the transmitter coil inductor is N times the voltage across the original inductor, where N is the number of sections. The ASI structure helps achieve higher power transfer for similar efficiency by increasing the effective voltage for the same current. Also, because the power transfer is doubled for the same hardware, the ASI structure improves the power transfer of CDMA-WPT for a given number of actors.

The use of segregated inductors leads to a higher effective voltage across the WPT coil, thereby doubling the power transfer for only a proportional increase in the losses. So, the use of ASI keeps the efficiency constant while increasing the power output N-fold. The power transferred improves by using more sections because the power output of the transceivers increases with the number of sections. Hence by using ASI, the number of actors remains constant, but the power transfer becomes N times greater than that of a normal transmitter.

Example—Extended CMCD Transceiver with ASI Structure. The table below shows component values for the transceivers. The CMCD tank inductors were realized using the toroid core of 67 material from Fair-Rite to enable higher coupling between the inductors and to achieve a higher quality factor. The duty cycle of the ternary codes (ratio of the sum of all polarity periods to the total code period) was kept at nearly 66%, since this duty-cycle gives minimum interference between the orthogonal codes, which means that this duty-cycle represents the lower bound on power and efficiency.

COMPONENTS FOR TRANSCEIVERS

| Component | Value | Description |
|---|---|---|
| GaN FET | GS61008p from GaN system | 100 V, 7 mΩ, 280 pF |
| $L_r$ | 980 nH | Using single-layered foil on core 5967002701 from fair-rite |
| $L_{WPT}$ | 00 nH/800 nH | 2 Single-layer air core solenoids with foil conductors |
| $C_r$ | 220 pF/47 pF | 501S42E221JV3S/102S42E470JV3S from Johanson Technology |
| $L_{choke}$ | 22 µH | EPCOS B82111E Series |
| $f_r$ | 8.9 MHz | Resonant frequency |
| $k_r$ | 0.6 | Coupling between CMCD tank inductors |

In this example, an ASI transmitter with two segments was tested with a normal receiver, i.e., a receiver without ASI, such as one with a transceiver configured as shown in FIG. 10. For simplicity, the transmitters and receiver were controlled by the same FPGA to ensure synchronization. To verify the effectiveness of the ASI structure, two different open-circuit receivers were driven using an ASI transmitter with two segments and a normal transmitter. The two extended CMCDs in the ASI structure had the same components as the extended CMCD in the normal transmitter.

The ASI structure approximately doubled the voltage across the receiver. The dc-dc power transferred using a normal transmitter is 5.2 Watts at a distance of 1 cm with an efficiency of 69% for minimal-interference codes, whereas the ASI transmitter had an efficiency of 70.2% with a dc-dc power transfer of 9.76 Watts.

The two transmitters were then used to realize four orthogonal codes on WPT inductors. The above-referenced inductor ratio was increased from 0.4 to 0.8 to realize four orthogonal codes. The larger ratio, however, decreased the dc power output to 1.23 Watts with a dc-dc efficiency of 60%. The ASI structure was able to increase the power output to 2.6 Watts with a 62.3% dc-dc efficiency with a minimum-interference code.

The above-described active segregated inductor structure was thus able to overcome the above-referenced tradeoffs by increasing the effective voltage across the WPT inductors. Power output was increased without adversely affecting efficiency for both two- and four-actor scenarios.

Figure 12:
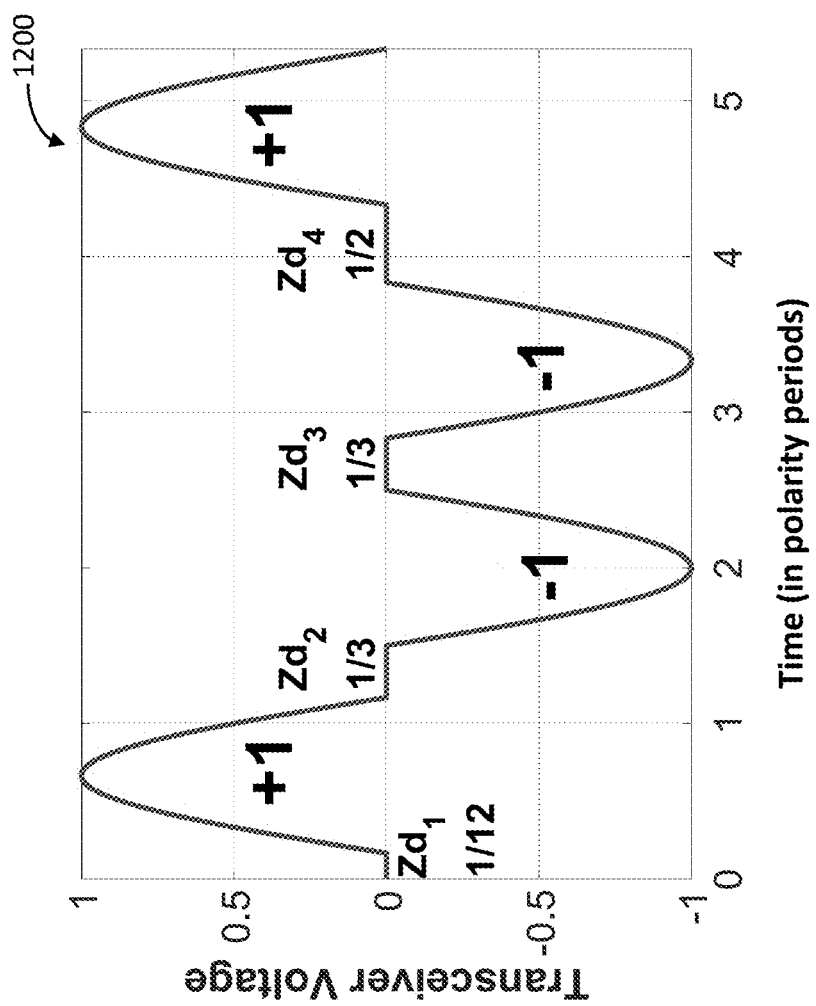
FIG. 12 is a plot of a waveform shaped in accordance with a code sequence having zero durations in accordance with one example.

FIG. 12 depicts another example ternary code sequence 1200. As with the above-described code sequences, the ternary code sequence 1200 includes a positive polarity code, a negative polarity code, and a number of intervening zero duration codes. In this case, the zero duration codes are non-uniform, with durations of either one-twelfth, one-third, or one-half of the polarity period. For those having a duration of one-third of the polarity period, the positive and negative polarity codes have durations about three times longer than the zero code. In some cases, code sequences do not have zero durations of any greater length than one-third, insofar as any increase in length may not provide any greater benefit in interaction avoidance.

The code sequence of FIG. 12 may be used as an element of a longer code sequence. For instance, the code sequence may be one of several orthogonal code sequences, each of which is four polarity periods long. Further orthogonal code sequences may then be formed via concatenation of two or more of the four polarity period code elements. Because each code element is orthogonal with the other code elements, any resulting concatenation will also be orthogonal with all other concatenations. The concatenation of code elements may then be used to accommodate a greater number of actors.

Figure 13:
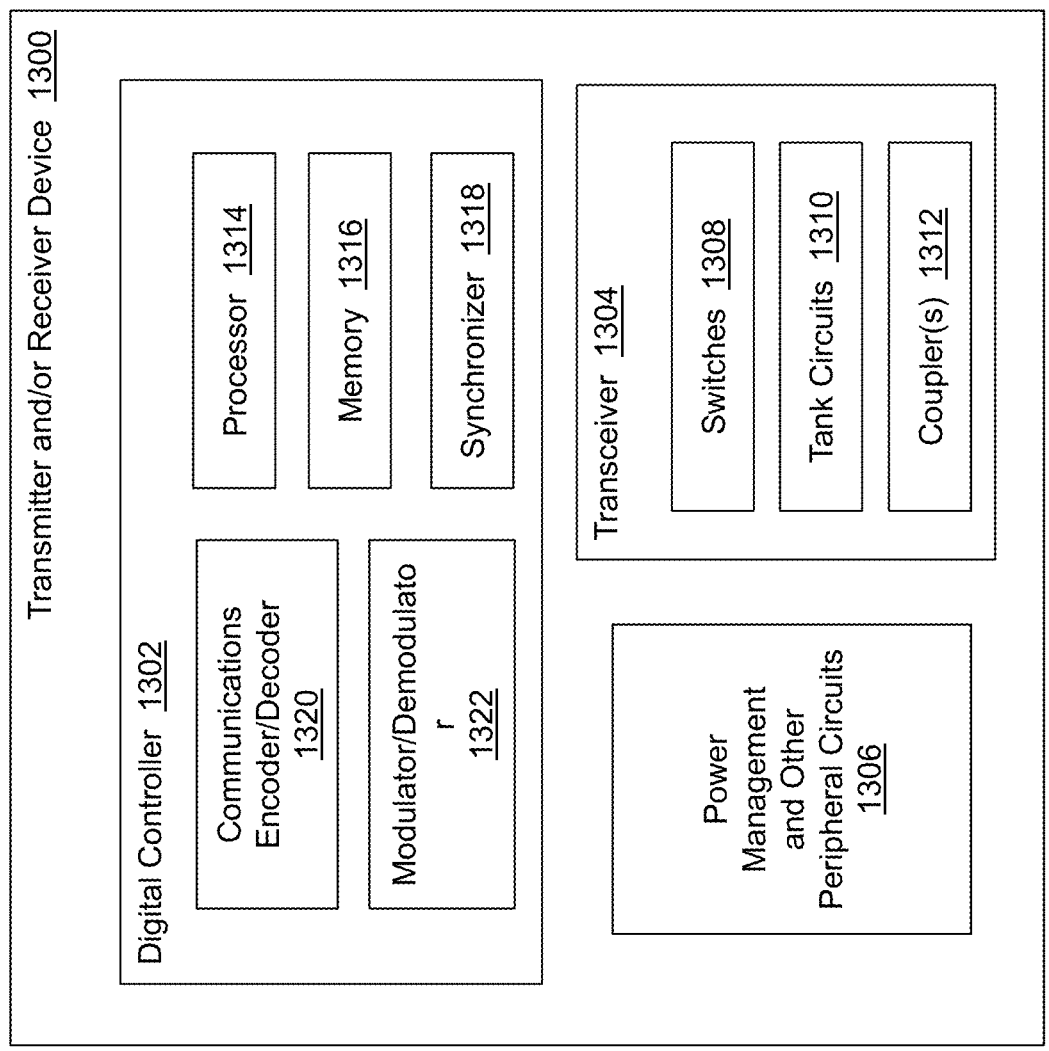
FIG. 13 is a block diagram of a transmitter device or a receiver device configured for multiple access wireless power transfer in accordance with one example.

FIG. 13 depicts a device 1300 configured for wireless power transfer. The device 1300 may act as a transmitter device and/or a receiver device. For example, the device 1300 may be a sensor or other device that operates in a peer-to-peer network in which the device 1300 alternates between transmission and reception of wireless power. The nature of the device 1300 may vary. For instance, the device 1300 may or may not perform functions beyond power transfer (e.g., charging).

The device 1300 includes a digital controller 1302 configured to generate a plurality of switch control signals, a transceiver 1304 configured to generate a wireless signal for the wireless power transfer, and power management and/or other peripheral circuitry 1306. The configuration, construction, and other characteristics of the circuitry 1306 may vary considerably.

The transceiver 1304 may be configured in accordance with one or more of the examples described herein, and/or another transceiver. For instance, the transceiver 1304 includes a plurality of switches 1308, a plurality of tank circuits 1310, and one or more coupling elements 1312, as described above. Each resonant tank circuit 1310 is connected to a respective pair of the plurality of switches. In one example, each switch 1308 is or includes a field effect transistor (FET), such as a GaN FET, but alternative or additional transistors or switches may be used. Each switch 1308 may have a gate or other control terminal to which a control signal is applied to control the state of the switch 1308, i.e., open or closed. The tank circuits 1310 may be configured as described above. The construction, configuration, and other characteristics of the capacitive and inductive elements of the tank circuits 1310 may vary. For instance, one or more of the elements may be lumped or distributed elements, or parasitic in nature.

Each switch 1308 is responsive to a respective switch control signal of a plurality of switch control signals such that the wireless signal has a waveform shaped in accordance with a code sequence for the wireless power transfer pairing. The switches 1308 are driven by control signals to generate a power signal having a code or coding sequence or pattern. In some cases, the code sequence includes a sequence of half-sine waves of either positive or negative polarity. For instance, a positive half-sine wave may be representative of a +1. A negative half-sine wave may be representative of a −1. An example code sequence may be 1, 1, −1, 1. Other waveform shapes may be used to represent the codes in the sequence. In some cases, each waveform is separated from adjacent waveforms by a zero voltage interval.

As described herein, the code sequence is one of a set of predetermined code sequences, each predetermined code sequence being orthogonal to each other predetermined code sequence of the set of predetermined code sequences. Such orthogonality of the code sequences in the set allows the device 1300 to participate in wireless power transfer with a particular device with a matching or otherwise appropriate code sequence, while avoiding interference and other interaction with other nearby devices and actors using orthogonal code sequences.

The code sequence is selected in accordance with the desired wireless transfer pairing or other relationship. In some cases, the digital controller 1302 is configured to adjust the plurality of switch control signals such that the waveform is synchronized with a waveform of a further transceiver. For instance, the digital controller 1302 may adjust the signals so that the transceiver 1304 generates a voltage waveform appropriate for transmission of wireless power to a receiver device with a predetermined or otherwise established current waveform. In other cases, the transceiver 1304 is configured, via a further plurality of switch control signals provided to the plurality of switches, to generate a current and/or a voltage having a waveform shaped in accordance with a further code sequence of the set of predetermined code sequences for receipt of power via a further wireless signal. In some cases, the device 1300 may determine the code sequence from the incoming WPT signal.

The digital controller 1302 may include a processor 1314 and/or a memory 1316 on which instructions are stored for execution by the processor 1314. The processor 1314 may be or include a field programmable gate array (FPGA), integrated circuit, microprocessor, and/or other processor to generate the switch control signals. Data indicative of one or more code sequences of the set of code sequences may be stored on the memory 1316. The processor 1314 and the memory 1316 may be integrated to any desired extent.

In the example of FIG. 13, the digital controller 1302 further includes a synchronizer 1318, a communications encoder/decoder 1320, and a modulator/demodulator 1322. The functionality of any one or more of these units may be implemented by the processor 1314 to any desired extent. In some cases, any one or more units or other components of the digital controller 1302 may be integrated with other components of the digital controller 1302 in a system-on-a-chip (SoC) or other arrangement.

In some cases, the digital controller 1302 is configured to receive an instruction indicative of the code sequence. For example, data indicative of the code sequence may be delivered to the device 1300 from a receiver device, a central controlling device, or any other device or actor. The instruction may be delivered via a further wireless signal received by the device 1300, in which case the digital controller 1302 is further configured to determine the code sequence based on the further wireless signal. To that end, the encoder/decoder 1320 may be used to decode the data sent via the further wireless signal to determine the instruction. As described below, in some cases, the further wireless signal has a waveform shaped in accordance with a respective code sequence of the set of predetermined code sequences. The further wireless signal may alternatively or additionally be used by the synchronizer 1318 to synchronize the wireless signal with the further wireless signal.

Each resonant tank circuit 1310 may be configured as a current mode, Class D converter, as described above. In some cases, the plurality of switches and the plurality of resonant tank circuits are arranged such that the transceiver is configured as a four-quadrant current mode Class D transceiver, but the number of tank circuits may vary as described above. In some cases, the resonant tank circuits in at least a subset of the plurality of resonant tank circuits have different resonant frequencies. In one example, the range or spectrum of frequencies is from about 1 MHz to about 20 MHz. Other frequency ranges or spectrums may be used. The use of a range of frequencies may result in spread spectrum wireless power transfer.

Each coupling element 1312 may be or include an inductor, an antenna, capacitor, or a transmission line or waveguide. In cases in which multiple coupling elements 1312 are provided, each coupling element 1312 generates (or captures) a respective portion of the wireless signal, as described below. Each resonant tank circuit 1310 is disposed between one of the coupling elements 1312 and a respective pair of the switches 1308, as described above. Each coupling element 1312 is driven by a respective pair of the plurality of resonant circuits 1310. The resonant circuits 1310 in each respective pair may not be synchronized with one another, as described above.

The modulator 1322 is configured to modulate the waveform relative to the code sequence. In some cases, the modulation adjusts the waveform relative to the code sequence for purposes of modulating the wireless power transfer and/or to transmit information via the wireless power transfer. The modulation may be or include a phase shift of a portion of the code sequence. Alternatively or additionally, the modulation may be or include a skipped portion of the code sequence.

Two or more of the devices 1300 shown in FIG. 13 may be used to form a WPT system. For instance, one of devices 1300 may act as a transmitter device in which the transceiver is configured to generate a wireless signal, the wireless signal having a waveform shaped in accordance with a code sequence of a set of predetermined code sequences. The other device 1300 may then act as a receiver device, in which the transceiver is configured to generate a current, the current having a waveform shaped in accordance with the code sequence. The transceivers of the transmitter device and the receiver device are thus identical in that case. In some cases, the memory 1316 of the transmitter device and/or the receiver device has one or more of the code sequences of the set of predetermined code sequences stored thereon.

The system may include any number of such transmitter devices. The orthogonality of the code sequences used by each such transmitter device allows the transmitter devices to avoid interfering or interacting with one another. The system may include any number of such receiver devices for the same reason.

Figure 14:
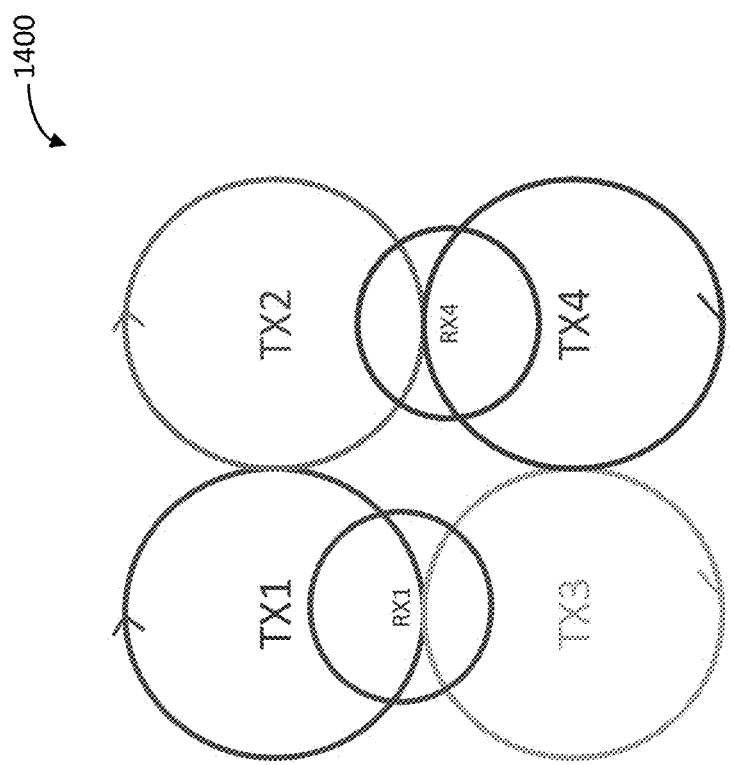
FIG. 14 is a schematic diagram of a charging device having a plurality of transmitter devices for wireless power transfer to one or more receiver devices in accordance with one example.

FIG. 14 depicts a charging device 1400 having a plurality of transmitter devices TX1-TX4 in accordance with one example. Each transmitter device may be configured as described herein. For example, each transmitter device may be or include the device 1300 of FIG. 13. The number of transmitter devices may vary. Each transmitter device transmits a wireless signal in accordance with a respective code sequence of the set of predetermined code sequences. As a result, receiver devices RX1 and RX4 may be configured to receive wireless power from only transmitter devices TX1 and TX4, respectively.

The charging device 1400 presents a surface or volume on which one or more portable receiver devices (e.g., a smart phone or smart watch) may be placed. For example, the charging device 1400 may be configured as a charging pad or other platform.

Figure 15:
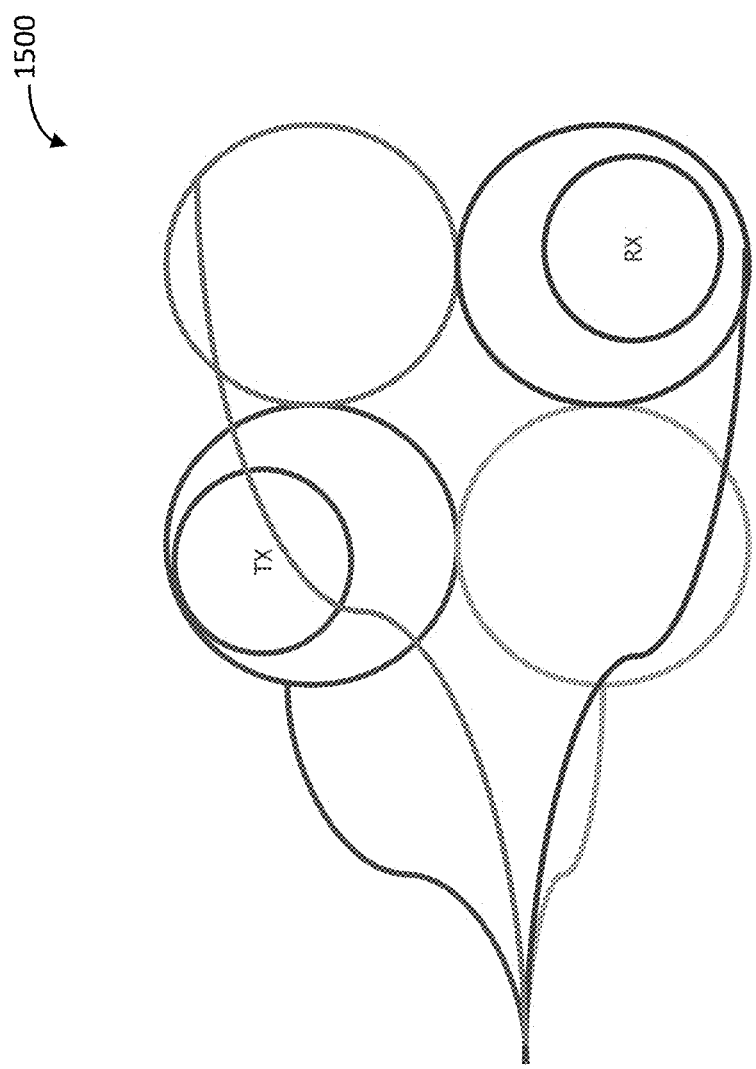
FIG. 15 is a schematic diagram of a relay charging device having a plurality of direct current (DC)-connected transceivers for wireless power transfer from a transmitter device to a receiver device in accordance with one example.

FIG. 15 depicts a relay charging device 1500 in accordance with another example. The relay charging device 1500 may also be configured as a charging pad or other platform. But in this case, the charging device 1500 is used to relay charge from one portable device TX, the source device, placed on the charging device to another portable device RX, the target device, placed on the charging device 1500. To relay the power across the pad, the relay charging device 1500 includes a number of devices (each depicted as a respective circle) that act as either transmitter devices or receiver devices. At least one of the devices acts as a transmitter device, and is coupled to the target device RX. At least one of the devices acts as a receiver device, and is configured to receive an external wireless power signal from the source device TX. The receiver device may then be coupled to the transmitter device via, for instance, a DC bus or other connection as shown. The charging device 1500 accordingly includes one or more rectifier or other switching circuits for AC-DC conversion. Alternatively or additionally, the receiver device and the transmitter device are coupled wirelessly via a WPT pairing as described herein, in which the receiver device acts as a transmitter and the transmitter device acts as a receiver.

Figure 16:
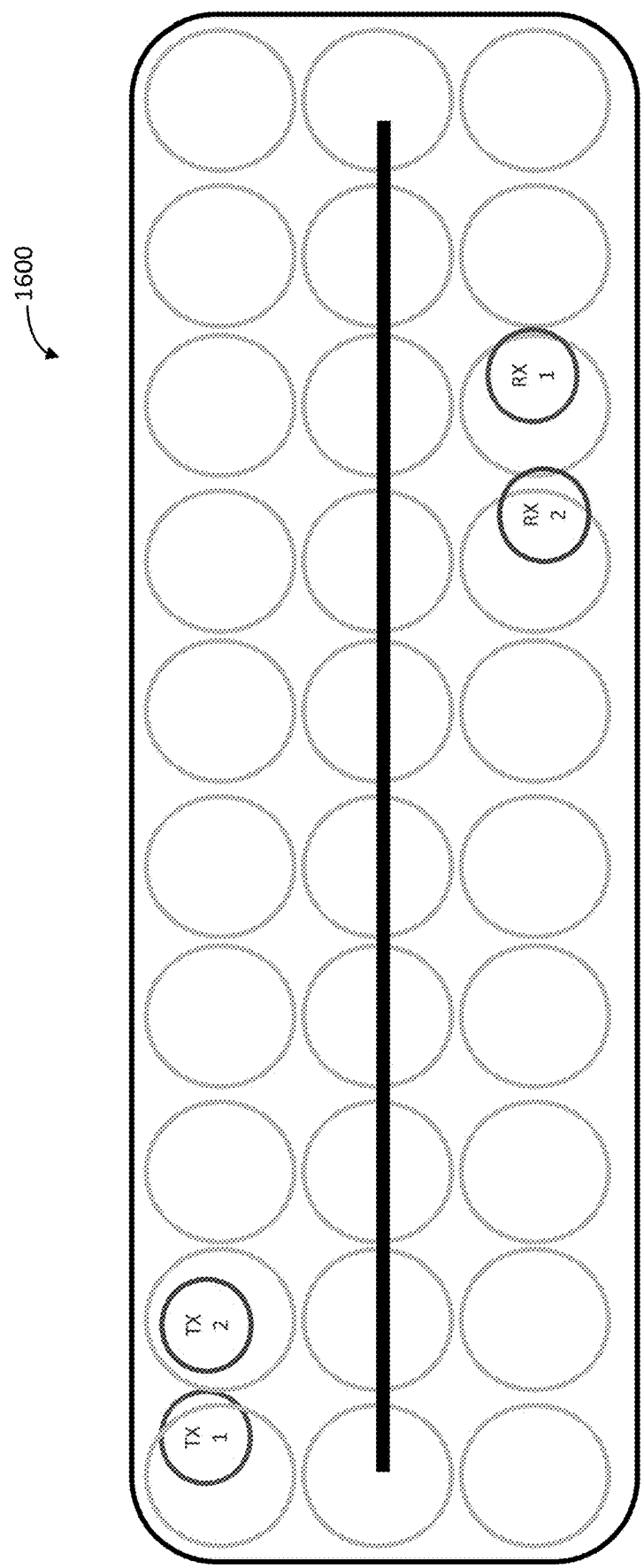
FIG. 16 is a schematic diagram of a relay charging device having a plurality of transceivers connected via a DC bus and/or inductively coupled transceivers for wireless power transfer from multiple transmitter devices to multiple receiver devices in accordance with one example.

FIG. 16 depicts a relay charging device 1600 in accordance with another example. The charging device 1600 may be, in some respects, an extension of the charging device 1500 of FIG. 15 when a direct current (DC) bus is used to connect the relay charging devices. The charging device 1600, for instance, may be configured as a table, bed (see a hospital bed example described below), or other extended surface. The charging device 1600 has any number of transceiver devices (each depicted by a respective circle) for relaying power from a source device to a target device. In this example, the charging device allows multiple source devices to transfer power to multiple target devices. A DC bus couples each of the transceiver devices of the charging device 1600 for power transfer therebetween. As described above, the receiver device and the transmitter device may instead be coupled wirelessly via a wireless power transfer pairing, instead of through a DC bus, in which the receiver device acts as a transmitter and the transmitter device acts as a receiver.

Figure 17:
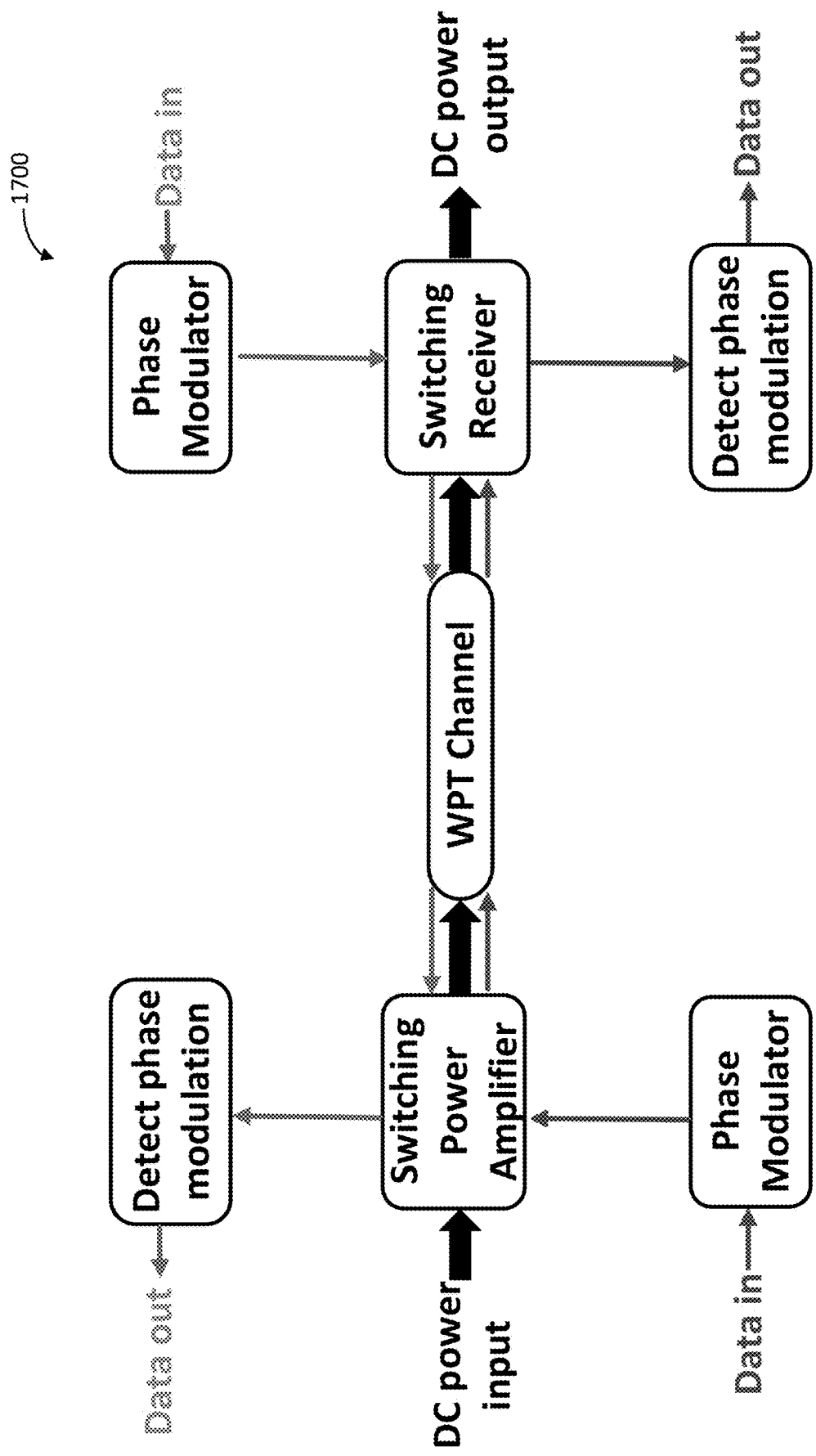
FIG. 17 is a block diagram of a system for wireless power transfer with phase modulation for data transfer in accordance with one example.

FIG. 17 depicts a system 1700 in which the WPT described herein is combined with data communications. The system 1700 is configured to simultaneously provide both wireless power and communications, e.g., to wide area sensors. The combination of wireless power transfer and data communications has several useful aspects, including multiple access (MA), high scalability and flexibility, covert operation with very low electromagnetic signature, imperviousness to jamming and damage from electromagnetic attack, communication security, and operation at distances appropriate for city environments.

The proliferation of wireless power transfer with communications is being fueled by the pervasiveness of miniaturized devices capable of computing, communicating, sensing, and acting. The critical need, originally from power and telemetry for medical implants has evolved. WPTC is bursting to transform, much like mobile communications has, from point-to-point connectivity towards meeting the necessity for massive scalability of multiple access in the Internet of Things. Using the disclosed devices, intelligent sensors for autonomous vehicles, robots, buildings, and infrastructure can be commissioned at any point in its lifecycle without moving a single wire, enabling rapid and seamless modifications for safety and performance. Enormous ensembles of electronic entities become capable of relaying, storing, and consuming simultaneous information and power—while standing still or moving as swarms.

Using code division multiplexing, scalable multiple access is achievable for these and other applications. Waveforms for wireless power transfer including a pseudorandom, three-state code sequence of positive and/or negative half-sine waves with a variable zero duration in-between creates additional degrees of freedom towards spectrum-spreading and code orthogonalization.

Figure 18:
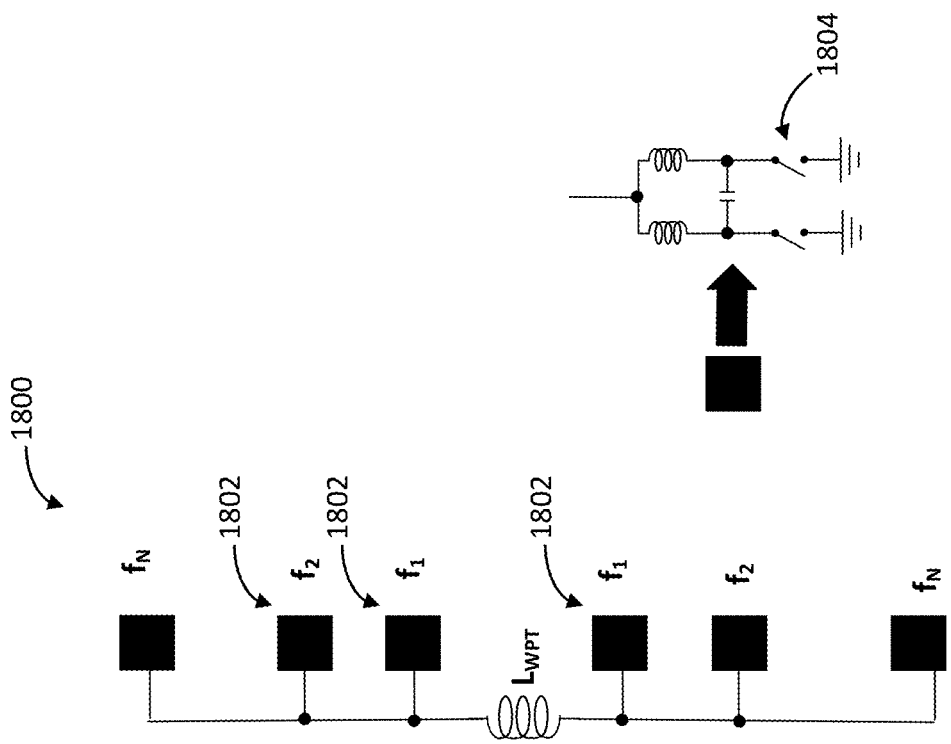
FIG. 18 is a schematic diagram of a transceiver having a plurality of current mode converters with different resonant frequencies for wireless power transfer in accordance with one example.
Figure 18:
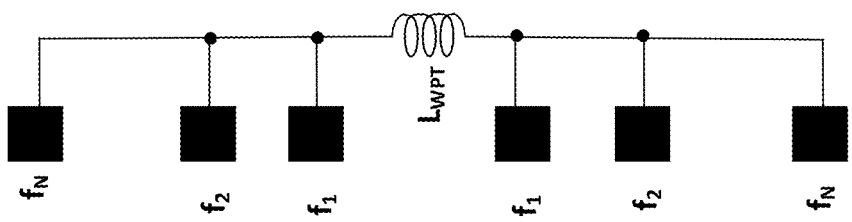

FIG. 18 depicts a transceiver 1800 having a plurality of resonant tank circuits 1802. Each resonant tank circuit 1802 is connected to a respective pair of switches 1804, as shown, and as described above. In this case, each resonant tank circuit has a different resonant frequency. In other cases, at least a subset of the resonant tank circuits have different resonant frequencies. The different resonant frequencies may be used to establish a spread spectrum wireless signal and/or code sequence modulation or other differentiation.

Figure 19:
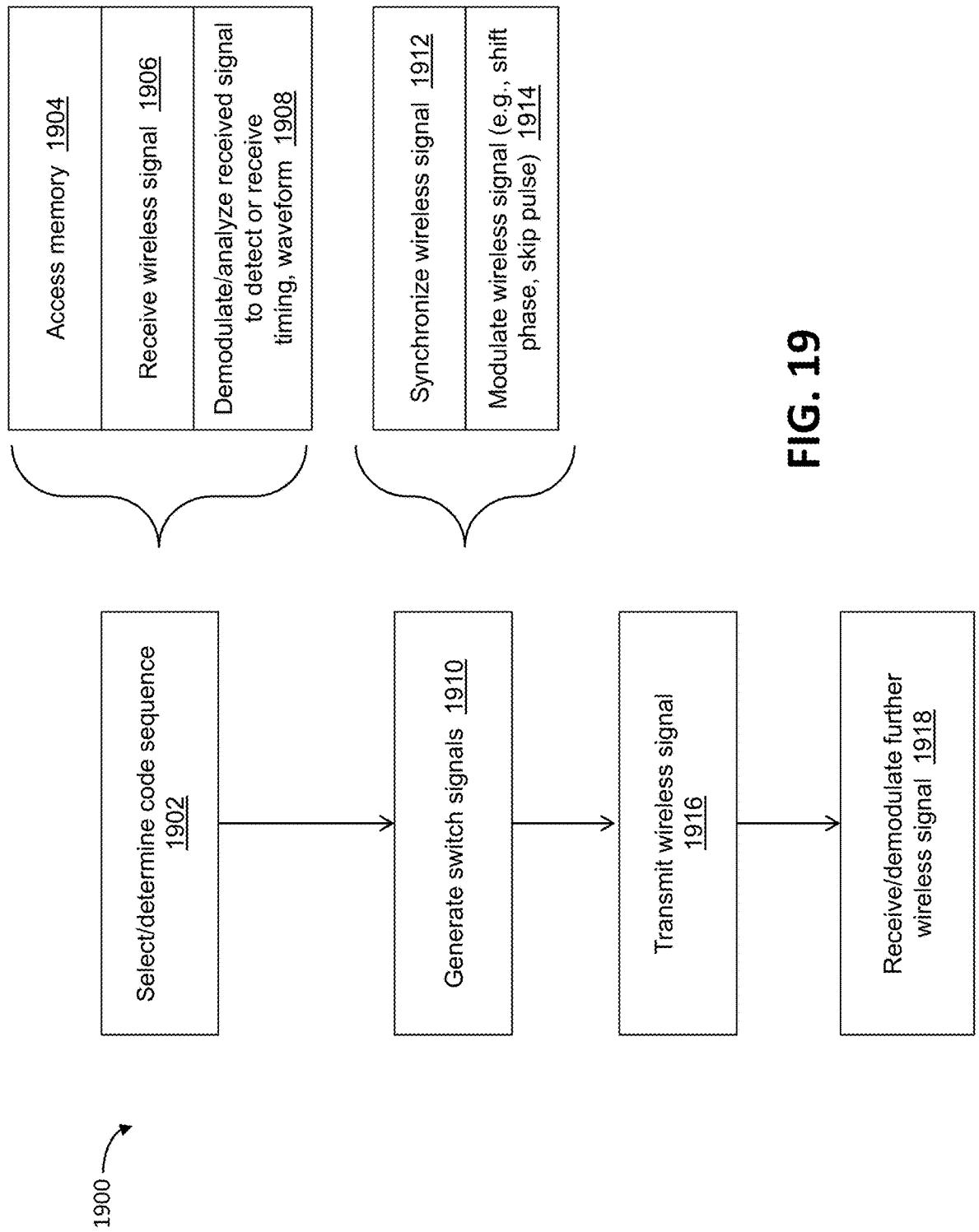
FIG. 19 is a flow diagram of a method implemented by a transmitter device for wireless power transfer in accordance with one example.

FIG. 19 depicts a method 1900 for wireless power transfer from a transmitter of a wireless power transfer pairing to a receiver of the wireless power transfer pairing. The method may be implemented by one of the transmitter devices described above, such as the transmitter device 1300 of FIG. 13, or another transmitter device. The method 1900 may be implemented in connection with realizing any one of the WPT devices, systems, or applications described herein.

The method 1900 may include fewer, additional, or alternative acts. For instance, the method 1900 may not include an act 1918 in which a further wireless signal is received by the transmitter device.

The method 1900 includes an act 1902 in which a code sequence is selected or determined. The code sequence is one of a set of orthogonal code sequences as described herein. In some cases, the code sequence may be selected by accessing a memory in an act 1904. Alternatively, a wireless signal may be received in an act 1906. The signal may then be demodulated, decoded, and/or otherwise analyzed in an act 1908 to detect or determine a waveform indicative of the code sequence, and/or determine other information, such as timing information for synchronization.

In an act 1910, a plurality of switch control signals are generated by a digital controller of the transmitter device in accordance with the code sequence for the wireless transfer pairing. The act 1910 may include synchronization in an act 1912 and/or modulation in an act 1914, as described above.

The wireless signal is then transmitted to the receiver in an act 1916 by a transceiver of the transmitter. The transceiver may include a plurality of switches such that the wireless signal has a waveform shaped in accordance with the code sequence as described above. The code sequence is one of a set of predetermined, orthogonal code sequences, also as described above.

The method may include receiving, by the transceiver of the transmitter, a further wireless signal in an act 1918. The further wireless signal may then be demodulated, decoded, and otherwise analyzed to determine data being communicated to the transmitter. In some cases, the code sequence may be determined by the digital controller of the transmitter based on the further wireless signal. For instance, the further wireless signal may be received from the receiver. The digital controller may use the further wireless signal to synchronize the wireless signal with the further wireless signal. In some cases, the further wireless signal has a waveform shaped in accordance with a respective code sequence of the set of predetermined code sequences.

The order of the acts of the method of FIG. 19 may vary from the example shown. For instance, the act 1918 may be implemented at the outset to support the code sequence determination.

Figure 20:
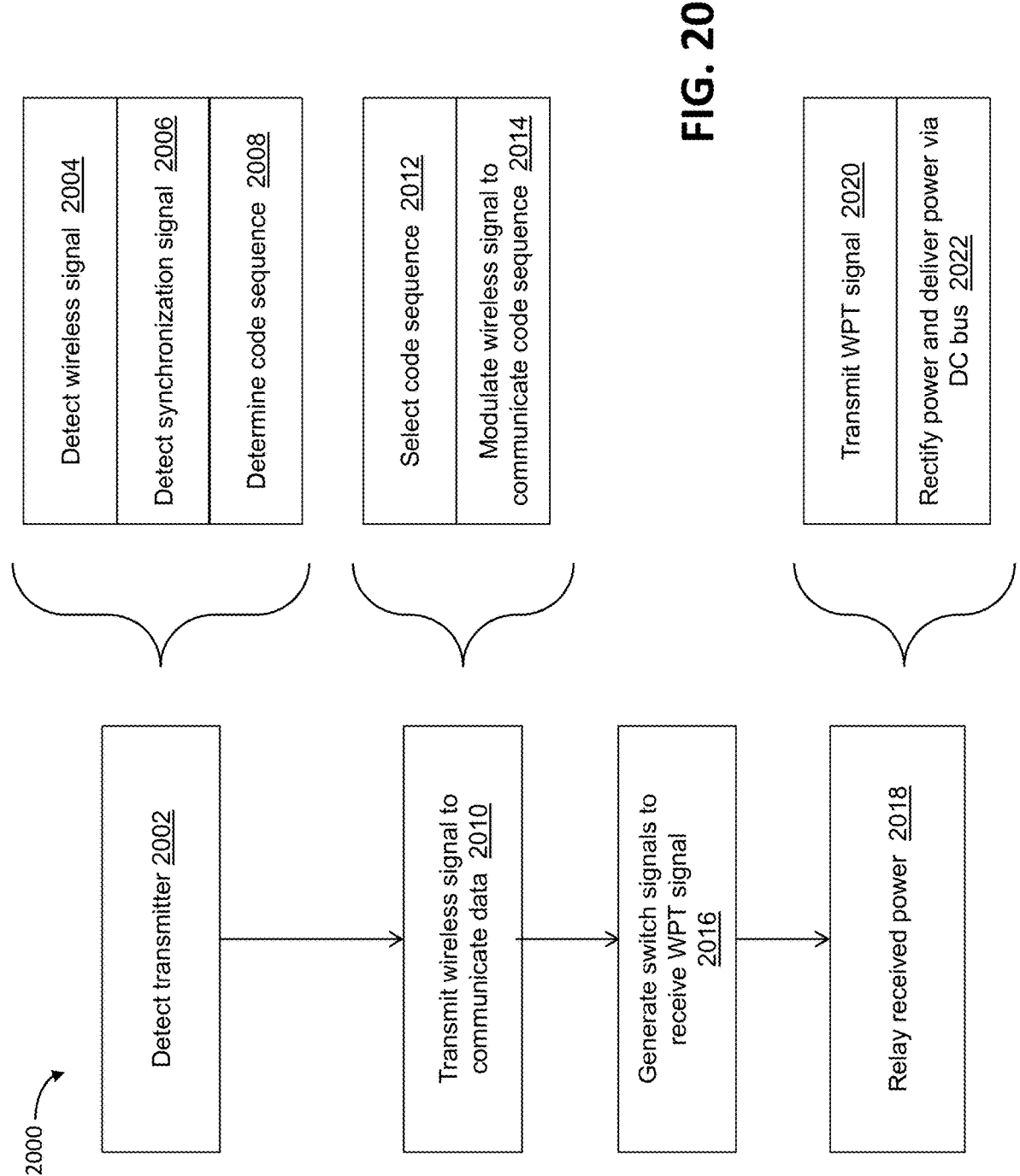
FIG. 20 is a flow diagram of a method implemented by a receiver device for wireless power transfer in accordance with one example.

FIG. 20 depicts a method 2000 for wireless power transfer from a transmitter device of a wireless power transfer pairing to a receiver device of the wireless power transfer pairing, The method may be implemented by one of the receiver devices described above, such as the receiver device 1300 of FIG. 13, or another receiver device. The method 1900 may be implemented in connection with realizing any one of the WPT devices, systems, or applications described herein.

The method 2000 may include fewer, additional, or alternative acts. For instance, the method 2000 may not include one or more acts directed to data communication.

The method 2000 includes detecting the transmitter device in an act 2002. In some cases, a wireless signal generated by the transmitter device is detected in an act 2004. Alternatively or additionally, a synchronization signal from the transmitter device or another device is detected in an act 2006. In some cases, the code sequence is selected from a set of predetermined code sequences or otherwise determined (e.g., based on a wireless signal from the transmitter) in an act 2008 in connection with the detection.

In the example of FIG. 20, the method 2000 includes an act 2010 in which a wireless signal is transmitted by the receiver device to communicate data to the transmitter device. In some cases, the data is indicative of the code sequence. The act 2010 may accordingly include the selection of the code sequence in an act 2012, and/or the modulation of the wireless signal to communicate the code sequence in an act 2014.

In an act 2016, a plurality of switch control signals are generated by a digital controller of the receiver device in accordance with the code sequence to receive, by a transceiver of the receiver device, the wireless signal. Each switch control signal is provided to a respective switch of the transceiver such that a current is generated in the transceiver, the current having a waveform shaped in accordance with the code sequence, as described above.

In some cases, the method 2000 further includes an act 2018 in which power captured via reception of the wireless signal is relayed to a further transmitter device. For instance, the act 2018 may be implemented in connection with the charging device examples described above. In some cases, a further WPT signal may be transmitted by the receiver device in an act 2020. Alternatively, relaying the power includes an act 2022 in which the power is rectified and delivered via a direct current (DC) bus coupling the receiver device and the further transmitter device. The further transmitter device is then configured for wireless power transfer via a further wireless signal having a waveform shaped in accordance with a further code sequence of the set of predetermined code sequences.

Figure 21:
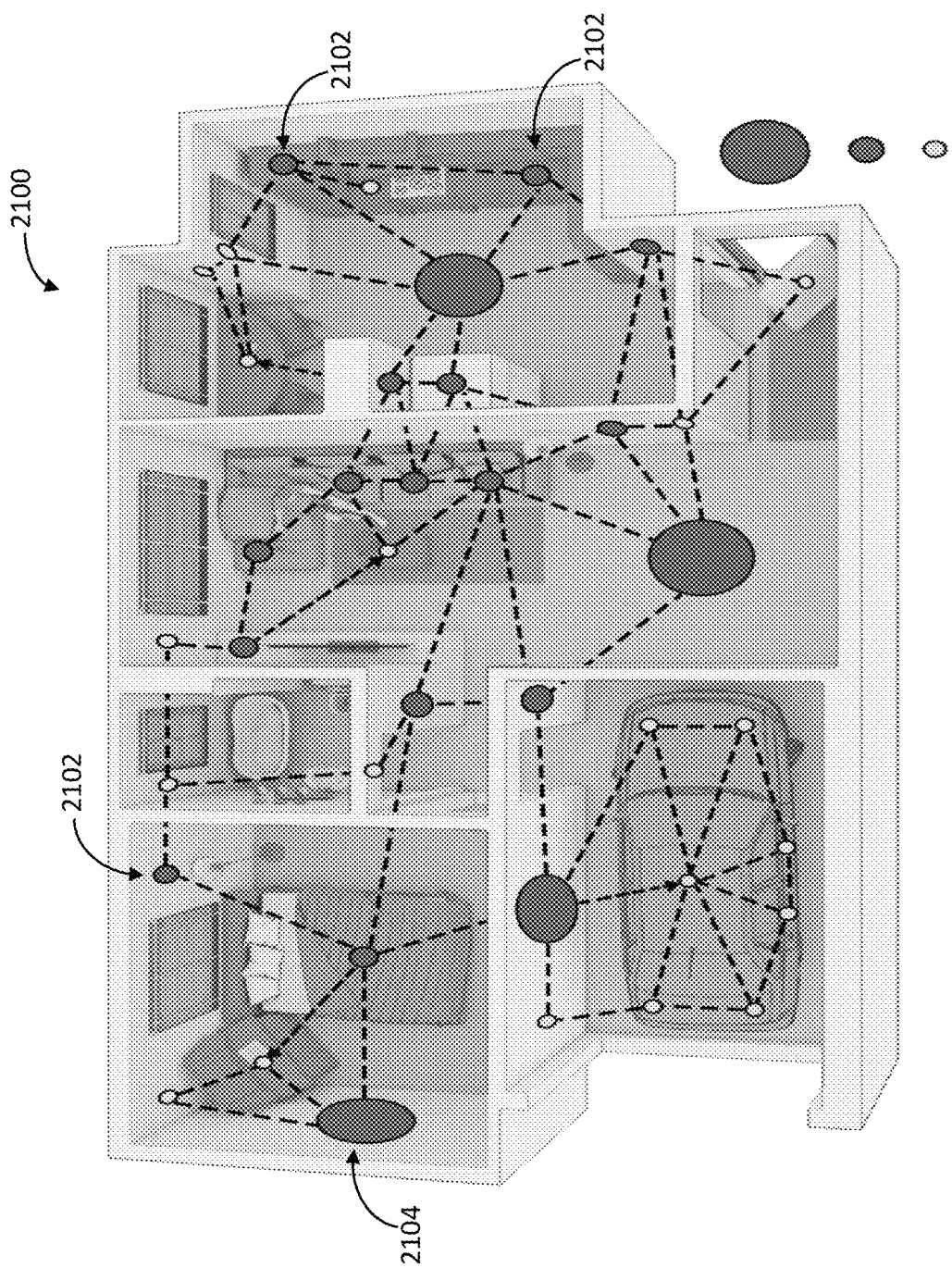
FIG. 21 is a schematic diagram of a household system in which multiple-actor wireless power transfer is achieved in accordance with one example.

FIG. 21 depicts an example of ubiquitous WPT system 2100 in which the above-described devices, systems, and methods enable pervasive sensors 2102 and devices 2104 in homes, buildings, and automobiles. These sensors and other devices may support the monitoring and control for occupancy, environment, and health among others. As part of the wireless power ecosystem, the sensors and other devices contribute by storing energy and relaying power, as well as consuming. Larger devices may be configured to operate as hubs for storage and transport. Some of the larger devices may also provide a gateway to power from the ac mains.

Within automobiles, especially with the advent of autonomous vehicles, a large number of sensors are needed. The traditional way of connecting sensors and actuators are through a wiring harness. But hard-wiring reduces reliability as well as greatly increases the cost of repair and retrofit. Wireless power transfer with embedded two-way communications enables the formation of ad-hoc in-vehicle networks providing both power and information. This wireless in-vehicle network can provide power and information to mobile devices such as phones and tablets along with a variety of health sensors.

The above-described devices, systems, and methods may also be applied within a variety of medical contexts. Wireless power transfer may support a wide variety of wireless health and medical devices, such as cardiac and neurologic implants, skin patch sensors, and automatic drug delivery pumps. The full potential of these medical devices may be reached through networking wireless power transfer. For instance, implants require wireless power transfer because of the risk of exit site infection with percutaneous leads. Wireless medical devices such as patch sensors are not only invaluable in critical care settings where contamination and infection can be fatal, but also in settings where mobility along with careful, yet unobtrusive monitoring is needed.

Figure 22:
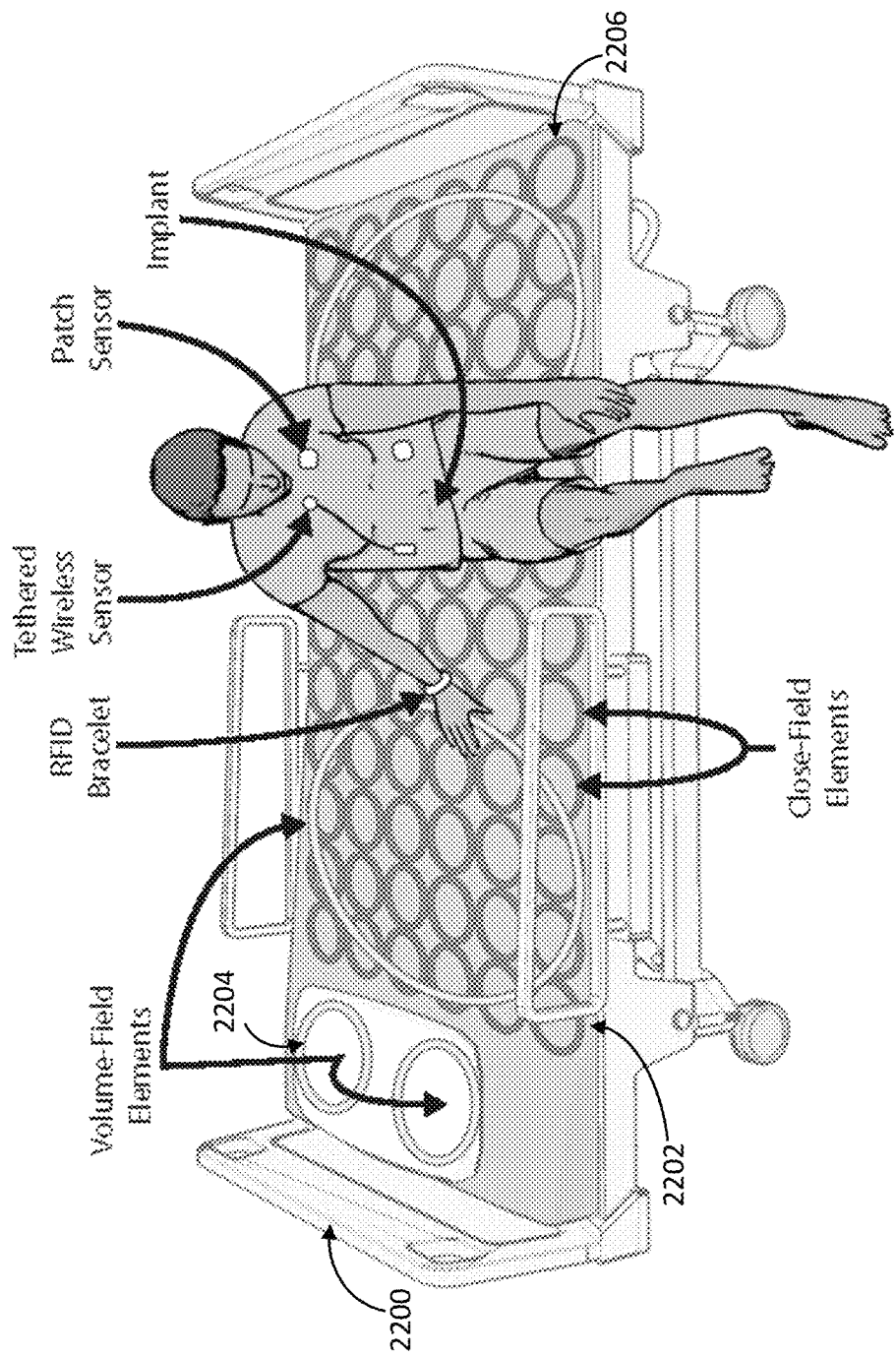
FIG. 22 is a schematic diagram of a hospital bed configured for multiple-actor wireless power transfer to a number of medical devices in accordance with one example.

FIG. 22 depicts an example of WPT in a medical application, in which a hospital bed 2200 is configured with multiple access wireless power transfer. The bed 2200 includes a coil array 2202 along with different-sized coils 2204, 2206 printed on a flexible sheet with magnetic fields that extend different distances. The WPT field from each coil can be encoded with different non-interfering code sequences and also possibly wound as a uniform Halbach array with a single-sided magnetic field.

Each processor referenced or described herein may be or include one or more processors or processing units, such as general processors, digital signal processors, application specific integrated circuits, field programmable gate arrays, networks, digital circuits, analog circuits, combinations thereof, or other now known or later developed devices for analyzing and processing data. The processor may be a component in a variety of systems.

Each memory referenced or described herein may be or include one or more memories, such as a main memory, a static memory, or a dynamic memory. The memory may include, but may not be limited to computer readable storage media such as various types of volatile and non-volatile storage media, including but not limited to random access memory, read-only memory, programmable read-only memory, electrically programmable read-only memory, electrically erasable read-only memory, flash memory, and the like. In one case, the memory may include a cache or random access memory for the processor. Alternatively or additionally, the memory may be separate from the processor, such as a cache memory of a processor, the system memory, or other memory. The memory may be an external storage device or database for storing data. Examples may include a hard drive, memory card, memory stick, or any other device operative to store data. The memory may be operable to store instructions executable by the processor.

The functions, acts or tasks illustrated in the figures or described herein may be performed by the programmed processor executing the instructions stored in the memory. The functions, acts or tasks may be independent of the particular type of instruction set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

Alternatively or additionally, dedicated hardware implementations, such as application specific integrated circuits, programmable logic arrays and other hardware devices, may be constructed to implement one or more of the control methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system may encompass software, firmware, and hardware implementations.

While the present invention has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

The foregoing description is given for clearness of understanding only, and no unnecessary limitations should be understood therefrom, as modifications within the scope of the invention may be apparent to those having ordinary skill in the art.

What is claimed is:

1. A device configured for wireless power transfer, the device comprising:
   a digital controller configured to generate a plurality of switch control signals; and
   a transceiver configured to generate a wireless signal for the wireless power transfer, the transceiver comprising a plurality of switches, each switch of the plurality of switches being responsive to a respective switch control signal of the plurality of switch control signals such that the wireless signal has a waveform shaped in accordance with a code sequence for the wireless power transfer,
   wherein the code sequence is one of a set of predetermined code sequences, each predetermined code sequence being orthogonal to each other predetermined code sequence of the set of predetermined code sequences, and
   wherein each predetermined code sequence of the set of predetermined code sequences is configured such that the waveform comprises a positive polarity, a negative polarity, and a zero duration segment between the positive and negative polarities.

2. The device of claim 1, wherein the digital controller is configured to adjust the plurality of switch control signals such that the waveform is synchronized with a waveform of a further transceiver.

3. The device of claim 1, wherein the digital controller is configured to receive an instruction indicative of the code sequence.

4. The device of claim 1, wherein:
   each predetermined code sequence of the set of predetermined code sequences comprises a concatenation of multiple code elements; and
   the multiple code elements are selected from a plurality of orthogonal code elements.

5. The device of claim 1, wherein:
   the transceiver is configured to receive a further wireless signal; and
   the digital controller is further configured to determine the code sequence based on the further wireless signal.

6. The device of claim 5, wherein the further wireless signal has a waveform shaped in accordance with a respective code sequence of the set of predetermined code sequences.

7. The device of claim 5, wherein the digital controller is further configured to synchronize the wireless signal with the further wireless signal.

8. The device of claim 1, wherein the digital controller comprises a modulator, the modulator being configured to modulate the waveform relative to the code sequence.

9. The device of claim 1, wherein the transceiver is configured, via a further plurality of switch control signals provided to the plurality of switches, to generate a current or voltage having a waveform shaped in accordance with a further code sequence of the set of predetermined code sequences for receipt of power via a further wireless signal.

10. A charging device comprising a plurality of transmitter devices, wherein each transmitter device of the plurality of transmitter devices is configured as the device of claim 1, and wherein each transmitter device of the plurality of transmitter devices transmits in accordance with a respective code sequence of the set of predetermined code sequences.

11. A relay charging device comprising a transmitter device configured as the device of claim 1, and further comprising a receiver device configured to receive an external wireless power signal, the receiver device being coupled to the transmitter device, the receiver device comprising:
    a digital controller configured to generate a plurality of switch control signals; and
    a transceiver configured to generate a current or a voltage, the transceiver comprising a plurality of switches, each switch of the plurality of switches being responsive to a respective switch control signal of the plurality of switch control signals such that the current or the voltage has a waveform shaped in accordance with a further code sequence of the set of predetermined code sequences.

12. The relay charging device of claim 11, further comprising a direct current (DC) bus coupling the transmitter device and the receiver device for power transfer therebetween.

13. The relay charging device of claim 11, wherein the receiver device and the transmitter device are coupled wirelessly via a wireless power transfer pairing in which the receiver device acts as a transmitter and the transmitter device acts as a receiver.

14. A device configured for wireless power transfer, the device comprising:
    a digital controller configured to generate a plurality of switch control signals; and
    a transceiver configured to generate a wireless signal for the wireless power transfer, the transceiver comprising a plurality of switches, each switch of the plurality of switches being responsive to a respective switch control signal of the plurality of switch control signals such that the wireless signal has a waveform shaped in accordance with a code sequence for the wireless power transfer,
    wherein the code sequence is one of a set of predetermined code sequences, each predetermined code sequence being orthogonal to each other predetermined code sequence of the set of predetermined code sequences, and
    wherein the transceiver comprises a plurality of resonant tank circuits, each resonant tank circuit of the plurality of resonant tank circuits being connected to a respective pair of the plurality of switches.

15. The device of claim 14, wherein each resonant tank circuit of the plurality of resonant tank circuits is configured as a current mode, Class D converter.

16. The device of claim 14, wherein the plurality of switches and the plurality of resonant tank circuits are arranged such that the transceiver is configured as a four-quadrant current mode Class D transceiver.

17. The device of claim 14, wherein the resonant tank circuits in at least a subset of the plurality of resonant tank circuits have different resonant frequencies.

18. The device of claim 14, wherein:
    the transceiver further comprises a plurality of coupling elements, each coupling element of the plurality of coupling elements generating a respective portion of the wireless signal; and
    each resonant tank circuit of the plurality of resonant tank circuits is disposed between one of the plurality of coupling elements and a respective pair of the plurality of switches.

19. The device of claim 18, wherein each coupling element of the plurality of coupling elements is driven by a respective pair of the plurality of resonant tank circuits.

20. The device of claim 19, wherein the resonant tank circuits in each respective pair of the plurality of resonant tank circuits have voltages that do not match one another.

21. The device of claim 18, wherein:
    each coupling element of the plurality of coupling elements is driven by a respective pair of the plurality of resonant tank circuits; and
    the resonant tank circuits in each respective pair of the plurality of resonant tank circuits are not synchronized with one another.

22. The device of claim 18, wherein each coupling element of the plurality of coupling elements comprises an antenna.

23. The device of claim 18, wherein each coupling element of the plurality of coupling elements comprises an inductor.

24. The device of claim 18, wherein each coupling element of the plurality of coupling elements comprises a capacitor.

25. The device of claim 18, wherein each coupling element of the plurality of coupling elements comprises a waveguide.

26. A device configured for wireless power transfer, the device comprising:
    a digital controller configured to generate a plurality of switch control signals; and
    a transceiver configured to generate a wireless signal for the wireless power transfer, the transceiver comprising a plurality of switches, each switch of the plurality of switches being responsive to a respective switch control signal of the plurality of switch control signals such that the wireless signal has a waveform shaped in accordance with a code sequence for the wireless power transfer,
    wherein the code sequence is one of a set of predetermined code sequences, each predetermined code sequence being orthogonal to each other predetermined code sequence of the set of predetermined code sequences,
    wherein the digital controller comprises a modulator, the modulator being configured to modulate the waveform relative to the code sequence, and
    wherein the modulator is configured to shift a phase of a portion of the code sequence to modulate the wireless power transfer, or to transmit information via the wireless power transfer.

27. A device configured for wireless power transfer, the device comprising:
    a digital controller configured to generate a plurality of switch control signals; and
    a transceiver configured to generate a wireless signal for the wireless power transfer, the transceiver comprising a plurality of switches, each switch of the plurality of switches being responsive to a respective switch control signal of the plurality of switch control signals such that the wireless signal has a waveform shaped in accordance with a code sequence for the wireless power transfer, wherein the code sequence is one of a set of predetermined code sequences, each predetermined code sequence being orthogonal to each other predetermined code sequence of the set of predetermined code sequences wherein the digital controller comprises a modulator, the modulator being configured to modulate the waveform relative to the code sequence, and wherein the modulator is configured to skip a portion of the code sequence to modulate the wireless power transfer, or to transmit information via the wireless power transfer.

28. A device configured for wireless power transfer, the device comprising:

a digital controller configured to generate a plurality of switch control signals; and a transceiver configured to generate a wireless signal for the wireless power transfer, the transceiver comprising a plurality of switches, each switch of the plurality of switches being responsive to a respective switch control signal of the plurality of switch control signals such that the wireless signal has a waveform shaped in accordance with a code sequence for the wireless power transfer, wherein the code sequence is one of a set of predetermined code sequences, each predetermined code sequence being orthogonal to each other predetermined code sequence of the set of predetermined code sequences, and wherein:

the code sequence is a ternary code sequence;

the ternary code sequence comprises a positive polarity code, a negative polarity code, and a zero code; and the positive and negative polarity codes have durations about three times longer than the zero code.

29. A device configured for wireless power transfer, the device comprising:

a digital controller configured to generate a plurality of switch control signals; and a transceiver configured to generate a wireless signal for the wireless power transfer, the transceiver comprising a plurality of switches, each switch of the plurality of switches being responsive to a respective switch control signal of the plurality of switch control signals such that the wireless signal has a waveform shaped in accordance with a code sequence for the wireless power transfer, wherein the code sequence is one of a set of predetermined code sequences, each predetermined code sequence being orthogonal to each other predetermined code sequence of the set of predetermined code sequences, and wherein the transceiver is configured to achieve zero voltage switching.

30. The device of claim 29, wherein the digital controller is configured to adjust the plurality of switch control signals such that the waveform is synchronized with a waveform of a further transceiver.

31. The device of claim 29, wherein the digital controller is configured to receive an instruction indicative of the code sequence.

32. The device of claim 29, wherein:

each predetermined code sequence of the set of predetermined code sequences comprises a concatenation of multiple code elements; and the multiple code elements are selected from a plurality of orthogonal code elements.

33. The device of claim 29, wherein:

the transceiver is configured to receive a further wireless signal; and the digital controller is further configured to determine the code sequence based on the further wireless signal.

34. The device of claim 33, wherein the further wireless signal has a waveform shaped in accordance with a respective code sequence of the set of predetermined code sequences.

35. The device of claim 33, wherein the digital controller is further configured to synchronize the wireless signal with the further wireless signal.

36. The device of claim 29, wherein the transceiver comprises a plurality of resonant tank circuits, each resonant tank circuit of the plurality of resonant tank circuits being connected to a respective pair of the plurality of switches.

37. The device of claim 36, wherein each resonant tank circuit of the plurality of resonant tank circuits is configured as a current mode, Class D converter.

38. The device of claim 36, wherein the plurality of switches and the plurality of resonant tank circuits are arranged such that the transceiver is configured as a four-quadrant current mode Class D transceiver.

39. The device of claim 36, wherein the resonant tank circuits in at least a subset of the plurality of resonant tank circuits have different resonant frequencies.

40. The device of claim 36, wherein:

the transceiver further comprises a plurality of coupling elements, each coupling element of the plurality of coupling elements generating a respective portion of the wireless signal; and each resonant tank circuit of the plurality of resonant tank circuits is disposed between one of the plurality of coupling elements and a respective pair of the plurality of switches.

41. The device of claim 40, wherein each coupling element of the plurality of coupling elements is driven by a respective pair of the plurality of resonant tank circuits.

42. The device of claim 41, wherein the resonant tank circuits in each respective pair of the plurality of resonant tank circuits have voltages that do not match one another.

43. The device of claim 40, wherein:

each coupling element of the plurality of coupling elements is driven by a respective pair of the plurality of resonant tank circuits; and the resonant tank circuits in each respective pair of the plurality of resonant tank circuits are not synchronized with one another.

44. The device of claim 40, wherein each coupling element of the plurality of coupling elements comprises an antenna.

45. The device of claim 40, wherein each coupling element of the plurality of coupling elements comprises an inductor.

46. The device of claim 40, wherein each coupling element of the plurality of coupling elements comprises a capacitor.

47. The device of claim 40, wherein each coupling element of the plurality of coupling elements comprises a waveguide.

48. The device of claim 29, wherein the digital controller comprises a modulator, the modulator being configured to modulate the waveform relative to the code sequence.

49. The device of claim 48, wherein the modulator is configured to shift a phase of a portion of the code sequence to modulate the wireless power transfer, or to transmit information via the wireless power transfer.

50. The device of claim 48, wherein the modulator is configured to skip a portion of the code sequence to modulate the wireless power transfer, or to transmit information via the wireless power transfer.

51. The device of claim 29, wherein:
the code sequence is a ternary code sequence;
the ternary code sequence comprises a positive polarity code, a negative polarity code, and a zero code; and
the positive and negative polarity codes have durations about three times longer than the zero code.

52. The device of claim 29, wherein the transceiver is configured, via a further plurality of switch control signals provided to the plurality of switches, to generate a current or voltage having a waveform shaped in accordance with a further code sequence of the set of predetermined code sequences for receipt of power via a further wireless signal.

53. A charging device comprising a plurality of transmitter devices, wherein each transmitter device of the plurality of transmitter devices is configured as the device of claim 29, and wherein each transmitter device of the plurality of transmitter devices transmits in accordance with a respective code sequence of the set of predetermined code sequences.

54. A relay charging device comprising a transmitter device configured as the device of claim 29, and further comprising a receiver device configured to receive an external wireless power signal, the receiver device being coupled to the transmitter device, the receiver device comprising:
a digital controller configured to generate a plurality of switch control signals; and
a transceiver configured to generate a current or a voltage, the transceiver comprising a plurality of switches, each switch of the plurality of switches being responsive to a respective switch control signal of the plurality of switch control signals such that the current or the voltage has a waveform shaped in accordance with a further code sequence of the set of predetermined code sequences.

55. The relay charging device of claim 54, further comprising a direct current (DC) bus coupling the transmitter device and the receiver device for power transfer therebetween.

56. The relay charging device of claim 54, wherein the receiver device and the transmitter device are coupled wirelessly via a wireless power transfer pairing in which the receiver device acts as a transmitter and the transmitter device acts as a receiver.

* * * * *